(12) United States Patent
Kamon et al.

(10) Patent No.: US 10,762,267 B2
(45) Date of Patent: Sep. 1, 2020

(54) SYSTEM AND METHOD FOR ELECTRICAL BEHAVIOR MODELING IN A 3D VIRTUAL FABRICATION ENVIRONMENT

(71) Applicant: Coventor, Inc., Cary, NC (US)

(72) Inventors: Mattan Kamon, Concord, MA (US); Kenneth B. Greiner, Arlington, MA (US); David M. Fried, South Salem, NY (US); Vasanth Allampalli, Waltham, MA (US); Yiguang Yan, Watertown, MA (US)

(73) Assignee: Coventor, Inc., Cary, NC (US)

( * ) Notice: Subject to any disclaimer, the term of this patent is extended or adjusted under 35 U.S.C. 154(b) by 613 days.

(21) Appl. No.: 15/607,989

(22) Filed: May 30, 2017

(65) Prior Publication Data

US 2017/0344683 A1    Nov. 30, 2017

Related U.S. Application Data

(60) Provisional application No. 62/436,740, filed on Dec. 20, 2016, provisional application No. 62/343,081, filed on May 30, 2016.

(51) Int. Cl.
*G06F 30/367* (2020.01)
*G06F 30/23* (2020.01)
*G06F 30/39* (2020.01)
*G06F 119/18* (2020.01)

(52) U.S. Cl.
CPC ............ *G06F 30/367* (2020.01); *G06F 30/23* (2020.01); *G06F 30/39* (2020.01); *G06F 2119/18* (2020.01); *Y02P 90/265* (2015.11)

(58) Field of Classification Search
CPC .. G06F 17/5036; G06F 2217/12; G06F 30/23; G06F 30/367; G06F 30/39; G06F 2119/18; Y02P 90/265
See application file for complete search history.

(56) References Cited

U.S. PATENT DOCUMENTS

| | | | |
|---|---|---|---|
| 5,416,729 A | 5/1995 | Leon et al. | |
| 5,473,710 A | 12/1995 | Jaw et al. | |
| 6,116,766 A * | 9/2000 | Maseeh | G06F 17/5018 700/103 |
| 7,093,206 B2 | 8/2006 | Anand et al. | |

(Continued)

FOREIGN PATENT DOCUMENTS

| | | |
|---|---|---|
| GB | 2482076 A | 1/2012 |
| JP | 2003-345854 A | 12/2003 |

OTHER PUBLICATIONS

Schröpfer et al., Novel 3D Modeling Methods for Virtual Fabrication and EDA Compatible Design of MEMS Via Parametric Libraries. J Micromech Microeng. Jun. 2010;20(6):1-15.

(Continued)

*Primary Examiner* — Eunhee Kim
(74) *Attorney, Agent, or Firm* — McCarter & English, LLP; John S. Curran

(57) ABSTRACT

Modeling of electrical behavior during the virtual fabrication of a semiconductor device structure is discussed. Electrical behavior occurring in a designated region of a semiconductor device structure may be determined during the virtual fabrication process. For example, resistance or capacitance values may be determined within a modeling domain of interest.

20 Claims, 33 Drawing Sheets

(56) References Cited

U.S. PATENT DOCUMENTS

| | | |
|---|---|---|
| 7,467,077 B2 | 12/2008 | Hirai |
| 7,492,364 B2 | 2/2009 | Devarajan et al. |
| 7,526,739 B2 | 4/2009 | McIlrath |
| 7,783,999 B2 * | 8/2010 | Ou .................... G06F 17/5009 716/136 |
| 8,032,857 B2 | 10/2011 | McIlrath |
| 8,209,649 B2 | 6/2012 | McIlrath |
| 8,266,560 B2 | 9/2012 | McIlrath |
| 8,285,412 B2 | 10/2012 | Kyoh |
| 8,832,620 B1 | 9/2014 | Fried et al. |
| 8,959,464 B2 | 2/2015 | Greiner et al. |
| 9,317,632 B2 | 4/2016 | Faken et al. |
| 2005/0076316 A1 | 4/2005 | Pierrat et al. |
| 2005/0198602 A1 | 9/2005 | Brankner |
| 2005/0240895 A1 | 10/2005 | Smith et al. |
| 2006/0054088 A1 | 3/2006 | Jagawa et al. |
| 2007/0031745 A1 | 2/2007 | Ye et al. |
| 2007/0100487 A1 | 5/2007 | Cheng et al. |
| 2007/0118349 A1 | 5/2007 | Jakatdar et al. |
| 2007/0198114 A1 | 8/2007 | Hashima et al. |
| 2008/0058978 A1 | 3/2008 | Cain et al. |
| 2009/0006039 A1 | 1/2009 | Watanabe |
| 2009/0030660 A1 | 1/2009 | Celik et al. |
| 2009/0055789 A1 | 2/2009 | McIlrath |
| 2009/0064058 A1 | 3/2009 | McIlrath |
| 2009/0144042 A1 | 6/2009 | Lorenz et al. |
| 2010/0005437 A1 | 1/2010 | McIlrath |
| 2010/0057411 A1 * | 3/2010 | Li ........................ G06F 17/5036 703/2 |
| 2011/0138343 A1 | 6/2011 | Granik |
| 2011/0185323 A1 | 7/2011 | Hogan et al. |
| 2011/0289472 A1 | 11/2011 | Finkler et al. |
| 2011/0314437 A1 | 12/2011 | McIlrath |
| 2012/0129301 A1 | 5/2012 | Or-Bach et al. |
| 2012/0248595 A1 | 10/2012 | Or-Bach et al. |
| 2012/0264237 A1 | 10/2012 | Shearn et al. |
| 2012/0264514 A1 | 10/2012 | Lee et al. |
| 2012/0317528 A1 | 12/2012 | McIlrath |
| 2013/0130498 A1 | 5/2013 | Feustel et al. |
| 2013/0339918 A1 | 12/2013 | Clark |
| 2014/0282324 A1 * | 9/2014 | Greiner ............... G06F 17/5068 716/111 |

OTHER PUBLICATIONS

Spallek et al., Modelling and Simulating the Selective Epitaxial Growth of Silicon under Consideration of Anisotropic Growth Rates. IEEE, pp. 387-390 (2003).

* cited by examiner

| Process Steps | | | 520 | | 522 |
|---|---|---|---|---|---|
| Number | Action | Name | Materials(s) | Dopants(s) | Depth |
| 1 | Wafer Setup | Wafer Setup | | | |
| 2 | Sequence | M1 | /Silicon/Si_Xtal | | 50 |
| 2.1 | Sequence | M1 Films | | | |
| 2.1.1 | Conformal Deposit | NBLoK Cap Deposition | /Nitrides/Si3N4_NBLoK | | 25 |
| 2.1.2 | Conformal Deposit | SiCOH Deposition | /Oxides/Lowk/SiO2_SiCOH | | 80 |
| 2.1.3 | Conformal Deposit | LTO Deposition | /Oxides/SiO2_LTO/SiO2_LTO | | 20 |
| 2.2 | Sequence | M1 Litho | | | |
| 2.2.1 | Planarizing Deposit | ODL Deposition | /Organics/ODL | | 80 |
| 2.2.2 | Conformal Deposit | SiARC Deposition | /Silicon/SiARC | | 35 |
| 2.2.3 | Planarizing Deposit | Resist Deposition | /Organics/Resist | | 100 |
| 2.2.4 | Sequence | DDL Litho | | | |
| 2.2.4.1 | Expose Material | E1 Litho | /Organics/Resist | | 200 |
| 2.2.4.2 | Expose Material | E2 Litho | /Organics/Resist | | 200 |
| 2.3 | Sequence | M1 HMO | | | |
| 2.4 | Sequence | M1 Trench | | | |
| 2.5 | Sequence | M1 Fill | | | |
| 2.5.1 | Sequence | Barrier Ta Deposition - PICK ONE | | | |
| 2.5.2 | Sequence | Liner TaN Deposition - PICK ONE | | | |
| 2.5.3 | Sequence | Seed Cu Deposition - PICK ONE | | | |
| 2.5.4 | Electroplate Growth | Cu Electroplate | /Metals/Cu | | 350 |
| 2.5.5 | Polish | Cu CMP | | | |
| 2.6 | Electrical Measurements | Resistance/Capacitance Extraction | | | |
| 3 | Sequence | M2V1 | | | |
| 3.1 | Sequence | Mx Films | | | |
| 3.2 | Sequence | Mx EM Litho | | | |
| 3.3 | Sequence | Mx EM SIT | | | |
| 3.4 | Sequence | Mx EB Litho | | | |
| 3.5 | Sequence | Mx EB HMO | | | |
| 3.6 | Sequence | Vx Films | | | |
| 3.6.1 | Planarizing Deposit | ODL Dep | /Organics/ODL | | 50 |
| 3.6.2 | Conformal Deposit | LTO Dep | /Oxides/SiO2_LTO/SiO2_LTO | | 20 |
| 3.6.3 | Conformal Deposit | TiN HM Dep | /Metals/TiN | | 15 |
| 3.7 | Sequence | Vx E1 Litho | | | |
| 3.8 | Sequence | Vx E1 HMO | | | |
| 3.9 | Sequence | Vx E2 Litho | | | |
| 3.10 | Sequence | Vx E2 HMO | | | |
| 3.11 | Sequence | MxVx Etch | | | |
| 3.12 | Sequence | MxVx Fill | | | |
| 3.13 | Planarizing Deposit | Deposit | /Nitrides/Si3N4_NBoK | | 25 |
| 3.14 | Electrical Measurements | Resistance/Capacitance Extraction | | | |

510, 512, 530, 532

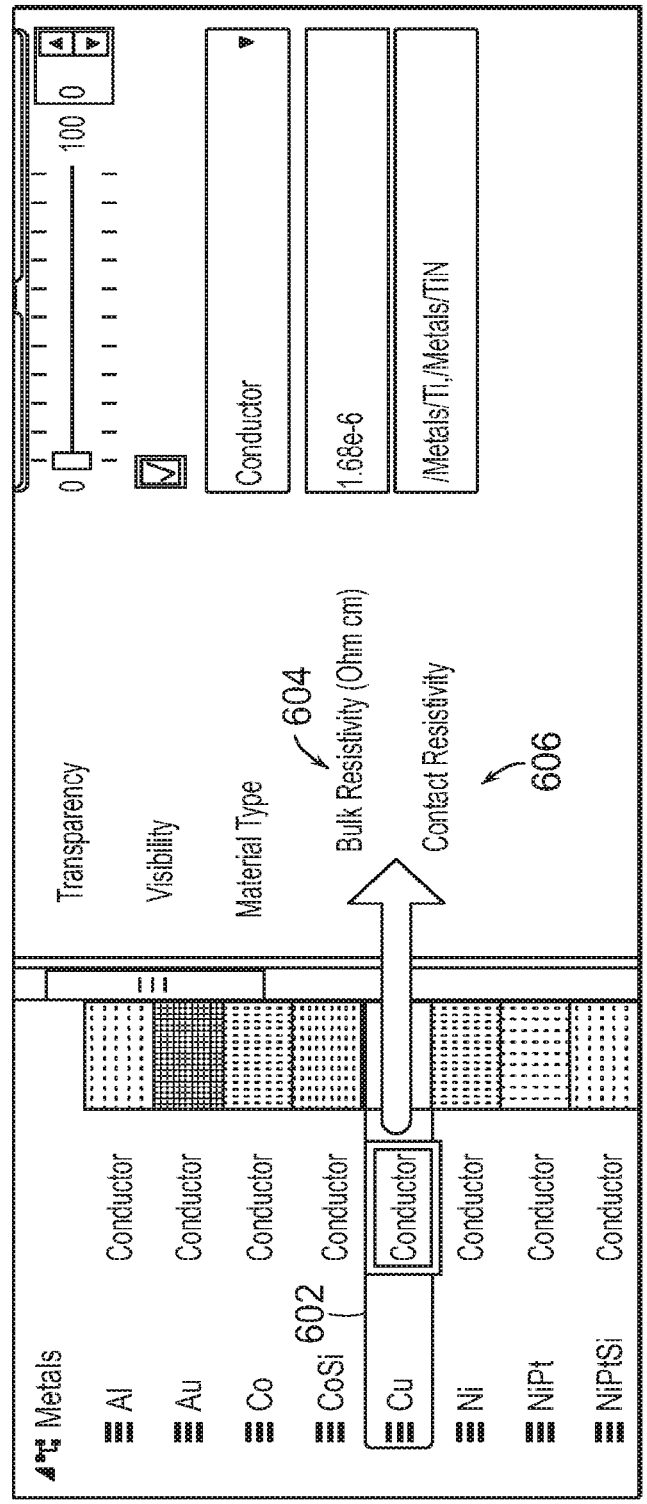

| Step Properties | |
|---|---|
| Name | Expression |
| Step Name | Electrical Measurement |
| Action | ⋎ Electrical Measurement |
| Skip this step if mask has no data | ☐ |
| Mask Name | required |
| Wafer | wafer 1 ▾ |
| Measurement Type | Resistance ▾ |
| ⊿ Resistance Measurements | ☐ + |
| ⊿Resistance 2 | ☒ |
| 751 — Start Port | start_port ▾ |
| 752 — End Port | end_port ▾ |
| Parameter Name | resistance |
| Advanced | ☐ |
| Exclude Fragment | |
| Error Tolerance | 1.0e-3 |

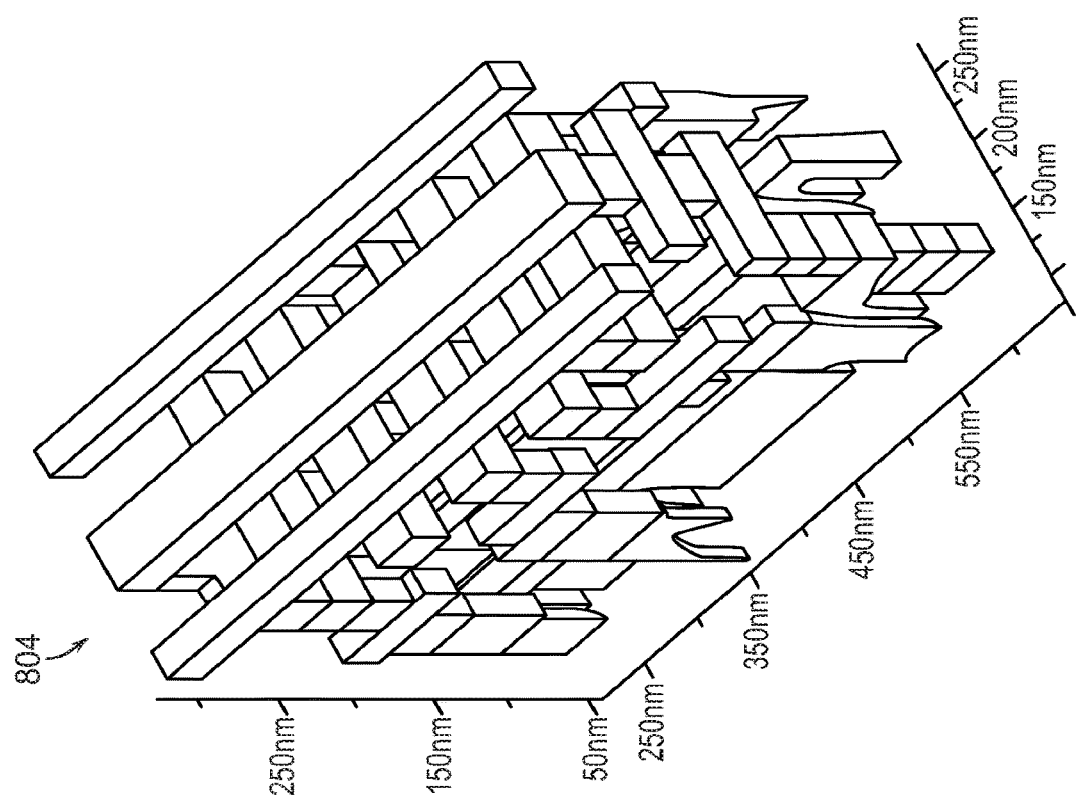
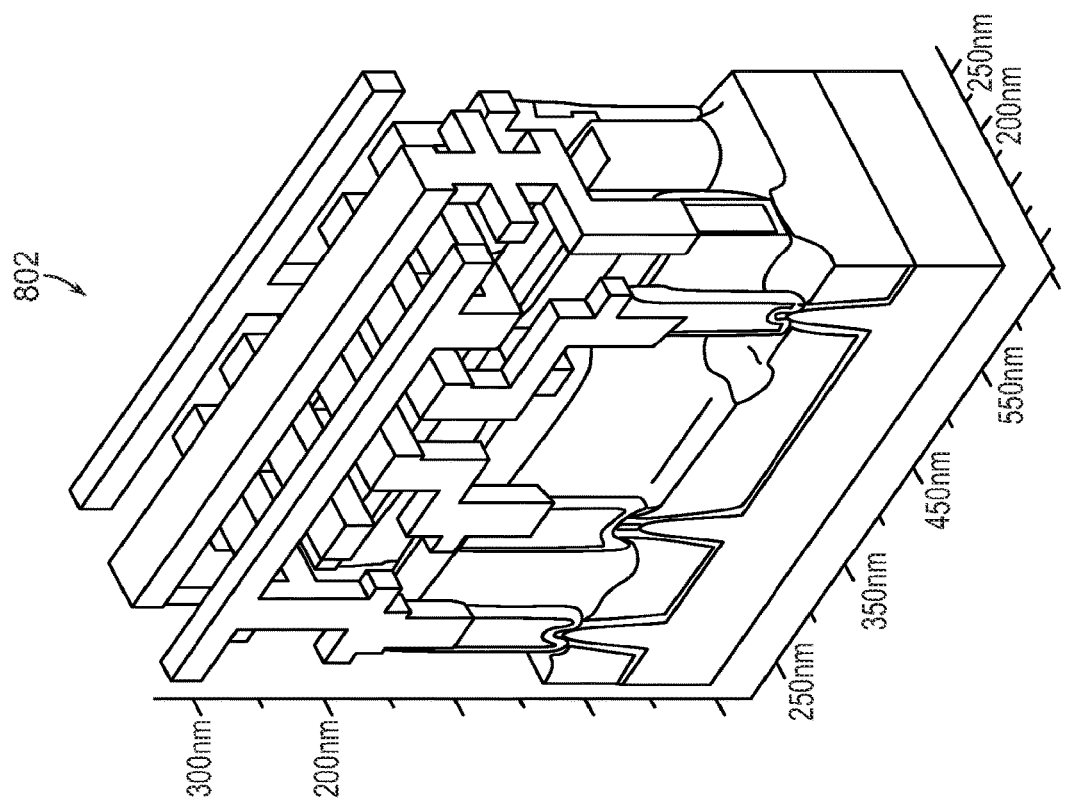
Figure 8

| Analysis Steps | | | |
|---|---|---|---|
| Number | Action | Name | Run After |
| 1 | IN OUT Name Ports (Electrical Analysis, 3D Export) | Name Ports | 5: Expose Material |
| 2 | Resistance Electrical Analysis (Electrical Analysis) | Electrical Measurement | 5: Expose Material |
| 3 | Capacitance Electrical Analysis (Electrical Analysis) | Electrical Analysis | 7: Deposit |
| 4 | $V_{DD}$ Name Nets (Electrical Analysis, 3D Export) | Name Nets | 8: Deposit |

910

912

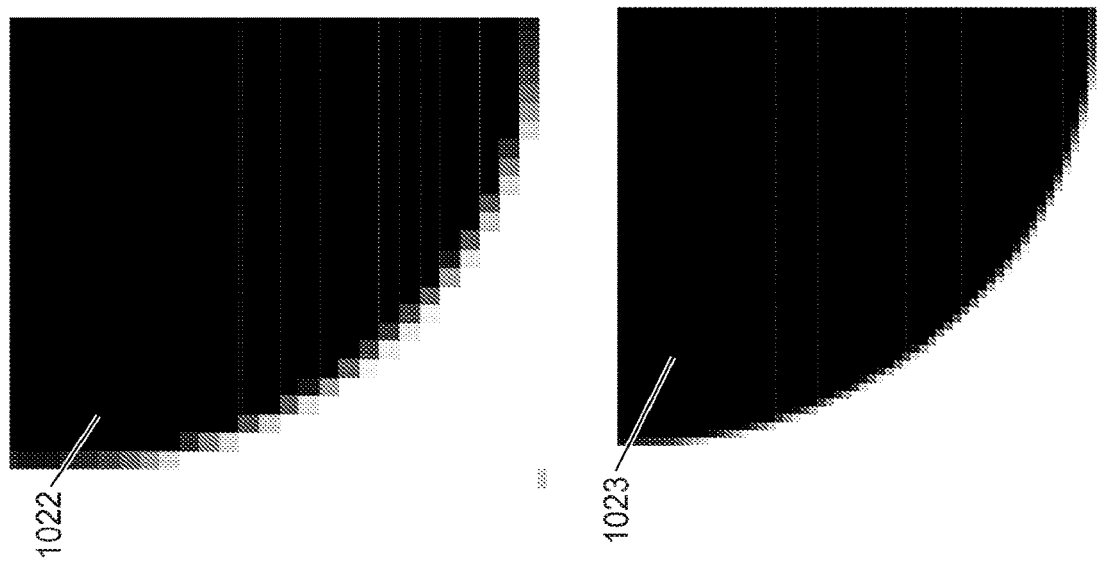
Figure 10C
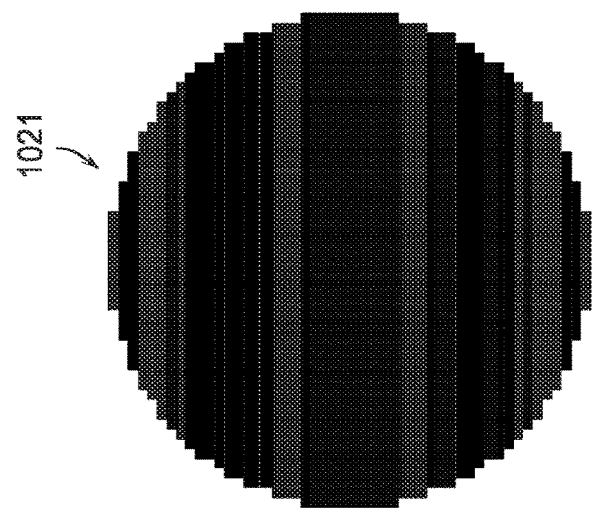

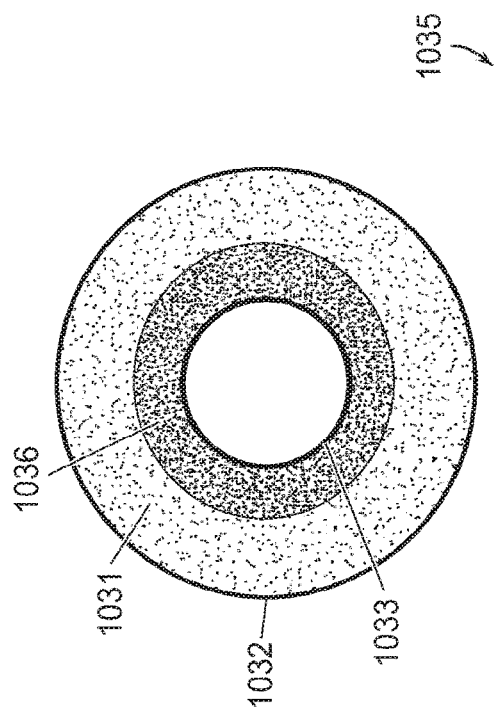
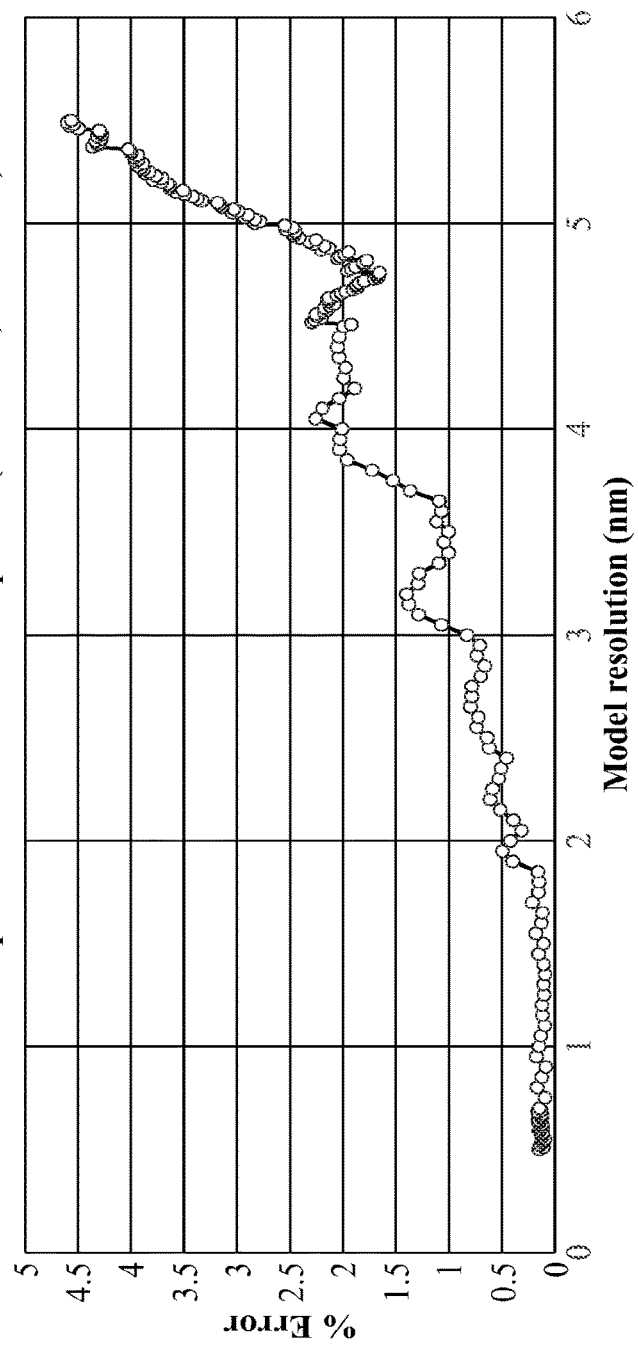
Figure 10D

Figure 13A

|    | e0       | e1       | e2       | e3       | e4       | e5       | e6       |
|----|----------|----------|----------|----------|----------|----------|----------|
| e0 | 9715.94  | -3115.25 | -3115.24 | 147.601  | -92.4883 | -1758.21 | -1758.51 |
| e1 | -3085.9  | 19348.6  | -11834   | -1834.1  | -2703.29 | -320.303 | -12.1113 |
| e2 | -3049.83 | -11767.1 | 19419.5  | -1828.93 | -2682.16 | -13.0554 | -317.222 |
| e3 | -162.7   | -1866.21 | -1861.89 | 3998.77  | -129.15  | -37.3824 | -37.6583 |
| e4 | -96.534  | -2720.89 | -2718.54 | -125.489 | 5633.54  | -38.3418 | -38.0641 |
| e5 | -1769.31 | -346.598 | -39.5408 | -37.0434 | -40.5253 | 2157.87  | -0.55917 |
| e6 | -1769.67 | -40.2385 | -347.487 | -37.3841 | -40.2858 | -0.53818 | 2158.52  |

↙ 1301

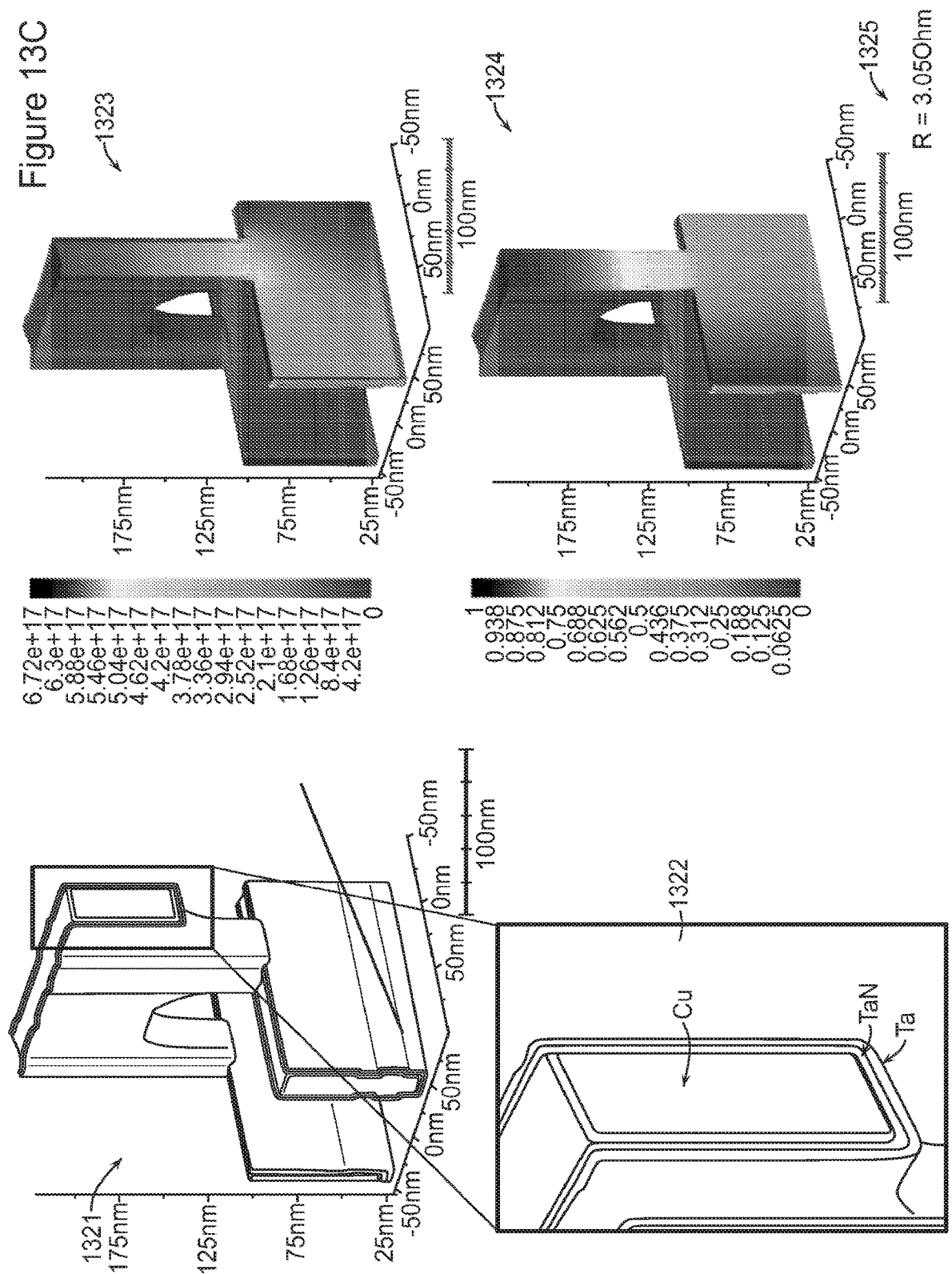

| Assembly File | BEOL10_Test_M1V1M2.zam | | |
|---|---|---|---|
| Run | M1E1_maskYshift | M1_lithoBias | TrenchSputterRatio |
| 0 | 0 | 0 | 0.66 |
| 1 | 3 | 0 | 0.66 |
| 2 | -3 | 0 | 0.66 |
| 3 | 0 | 1 | 0.66 |
| 4 | 3 | 1 | 0.66 |
| 5 | -3 | 1 | 0.66 |
| 6 | 0 | -1 | 0.66 |
| 7 | 3 | -1 | 0.66 |
| 8 | -3 | -1 | 0.66 |
| 9 | 0 | 0 | 1 |
| 10 | 3 | 0 | 1 |
| 11 | -3 | 0 | 1 |
| 12 | 0 | 1 | 1 |
| 13 | 3 | 1 | 1 |
| 14 | -3 | 1 | 1 |
| 15 | 0 | -1 | 1 |
| 16 | 3 | -1 | 1 |

Figure 16

| # Command | Expeditor BEOL10_Test_M1V1M2.xlsx -dir BEOL10_Test_M1V1M2_Exp -overwr | | | |
|---|---|---|---|---|
| # Output folder | C:\Users\matt\Documents\Semulator\Projects5\BEOL10nm\BEOL10_Test_M1V | | | |
| #Assembly File | BEOL10_Test_M1V1M2.zam | | | |
| #Step Names | | | | |
| Run | M1E1_maskYshift | M1_lithoBias | TrenchSputterRatio | Cap_e0_e1 |
| Run-0 | 0 | 0 | 0.66 | -0.000122931 |
| Run-1 | 3 | 0 | 0.66 | -0.000127199 |
| Run-2 | -3 | 0 | 0.66 | -0.000121662 |
| Run-3 | 0 | 1 | 0.66 | -0.000128944 |
| Run-4 | 3 | 1 | 0.66 | -0.000132294 |
| Run-5 | -3 | 1 | 0.66 | -0.000126713 |
| Run-6 | 0 | -1 | 0.66 | -0.000119235 |
| Run-7 | 3 | -1 | 0.66 | -0.000121684 |
| Run-8 | -3 | -1 | 0.66 | -0.000116393 |
| Run-9 | 0 | 0 | 1 | -0.000127146 |
| Run-10 | 3 | 0 | 1 | -0.000131415 |
| Run-11 | -3 | 0 | 1 | -0.00012586 |
| Run-12 | 0 | 1 | 1 | -0.000133124 |
| Run-13 | 3 | 1 | 1 | -0.000136857 |
| Run-14 | -3 | 1 | 1 | -0.00013094 |
| Run-15 | 0 | -1 | 1 | -0.000123324 |
| Run-16 | 3 | -1 | 1 | -0.000125871 |

1600

1602

1604

SYSTEM AND METHOD FOR ELECTRICAL BEHAVIOR MODELING IN A 3D VIRTUAL FABRICATION ENVIRONMENT

RELATED APPLICATIONS

This application claims the benefit of, and priority to, United States Provisional Patent Application No. 62/343,081, entitled "System and Method for Electrical Behavior Modeling in a 3-D Virtual Fabrication Environment", filed May 30, 2016 and United States Provisional Patent Application No. 62/436,740, entitled "System and Method for Electrical Behavior Modeling in a 3-D Virtual Fabrication Environment", filed Dec. 20, 2016, the contents of both applications incorporated herein by reference in their entirety.

BACKGROUND

Integrated circuits (ICs) implement a myriad of capabilities of modern electronic devices. To make the development of ICs more efficient, a semiconductor manufacturer will periodically develop a common fabrication process or "technology" to be used for production of its integrated circuits (for ease of explanation the term "technology" may be used herein to refer to a fabrication process for a semiconductor device structure that is being developed). To develop the next generation technology to meet demands on performance and miniaturization, semiconductor manufacturers and designers of ICs must understand the electrical behavior of the circuits that will be produced by the technology under development. The electrical behavior of a technology can typically be characterized by analyzing the limited number of structures which are then repeated millions of times to create a modern IC. Structures typically include, but are not limited to, transistors for logic or memory, capacitors, resistors, and the interconnect structures formed of the connecting conductive material such as wires or semiconductor material that electrically connect those transistors.

Fabricating experimental semiconductor wafers to measure electrical performance costs significant time and money, and so predicting behavior with software has been vital in technology development since the early days of integrated circuits. Electrical simulation tools that are often part of technology computer-aided design software suites have been used to simulate this electrical behavior to provide guidance in technology development.

Such electrical simulation tools, when applied to technology development, typically take as input a geometric model built from primitive geometric objects such as cubes, spheres, cylinders, or cylinders with polygonal cross section. Those objects have parameters to define their dimensions to create a variety of shapes. For instance, in FIG. 1A (prior art) an interconnect stack 100 includes a via, 102, connecting metal on layer 104 to metal on layer 106 and is defined with three primitives, each a rectangular solid. Each rectangular solid is described with parameters for its length, width, and height, and parameters for its location and orientation in space. These structures may also be formed from idealized structures formed from two-dimensional (2D) drawings also called layouts. For instance, a thickness profile can be attributed to each drawing and then the various thickened 2D structures can be stacked on top of one another to form the structure. The solid geometry represented by either the structures that are composed of primitives, or the idealized structures from layouts, can then be divided into a volume mesh of smaller elements that is necessary for simulation of electrical behavior in conventional software simulation tools. As an example, FIG. 1B (prior art) depicts a solid geometry (of the interconnect stack 100) whose volume has been meshed into tetrahedral elements 108. For those tetrahedra that have a face on the surface, the black lines show shared edges between adjacent tetrahedra. A mesh and the properties of the materials within each element are used by conventional simulators to compute the electrical behavior.

BRIEF SUMMARY

Embodiments of the present invention enable the modeling of electrical behavior during the virtual fabrication of a semiconductor device structure. In one embodiment, electrical behavior of a designated region of an IC may be determined during the virtual fabrication process. For example, resistance or capacitance values may be determined for the interconnect between ports of the transistors within the modeling domain. Further, the current-voltage (IV) characteristics including the transistors within the modeling domain may be determined during the virtual fabrication process.

In one embodiment, a computing device-implemented method determines electrical behavior in a circuit in a semiconductor device structure being virtually fabricated where the circuit includes at least one of one or more individual devices and one or more interconnect structures. The method includes receiving a process sequence for a semiconductor device structure to be virtually fabricated, the process sequence including at least one electrical behavior modeling step. The method also includes performing with the computing device a virtual fabrication run for the semiconductor device structure using the process sequence and 2D design data. The virtual fabrication run executes the process sequence to build a 3D structural model of the semiconductor device structure using an implicit geometry representation for the 3D structural model. The implicit geometry representation defines an interface between materials in the 3D structural model without an explicit representation of (x,y,z) coordinate locations of that interface. The virtual fabrication run also performs the at least one electrical behavior modeling step to determine electrical behavior data in a designated region of the 3D structural model using the implicit geometry representation without generating a conformal surface or volume mesh from the 3D structural model. The method further includes exporting or displaying the electrical behavior data determined by the at least one electrical behavior modeling step of the virtual fabrication run.

In another embodiment, a computing device is configured to determine electrical behavior in a circuit in a semiconductor device structure being virtually fabricated. The the circuit includes at least one of one or more individual devices and one or more interconnect structures and further includes a processor and memory. The memory holds instructions that when executed perform one or more virtual fabrication runs for the semiconductor device structure using a process sequence and 2D design data. The process sequence includes at least one electrical behavior modeling step. The one or more virtual fabrication runs execute the process sequence to build a 3D structural model of the semiconductor device structure using an implicit geometry representation for the 3D structural model. The implicit geometry representation defines an interface between materials in the 3D structural model without an explicit representation of (x,y,z) coordinate locations of that interface. The one or more virtual fabrication runs also perform the at least one electrical behavior modeling step to determine electrical behavior data in a designated region of the 3D structural model using the implicit geometry representation without generating a conformal surface or volume mesh from the 3D structural model. The electrical behavior data determined by the at least one electrical behavior modeling step of the virtual fabrication run is exported or displayed by the computing device.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIG. 5 depicts an exemplary process editor utilized in an embodiment of the present invention;

FIG. 6A depicts an exemplary selection of material property parameters for a resistance solving step in an embodiment of the present invention;

FIG. 7B depicts the naming of electrical nets in an electrical behavior modeling step performed by an embodiment of the present invention;

FIG. 7D depicts an exemplary selection of parameters in a resistance solving step in an embodiment of the present invention;

FIG. 8 depicts two exemplary 3D views of a semiconductor device structure undergoing a virtual fabrication process that includes a capacitance solving step;

FIG. 9A depicts an exemplary process editor configured to allow a user to set parameters for a capacitance solving step;

FIG. 9B depicts an exemplary analysis editor for representing electrical behavior and other measurements that are to occur at various steps in the process sequence;

FIG. 10C illustrates exemplary voxel-based geometry representation in an embodiment;

FIG. 10D depicts exemplary results from a capacitance solving step;

FIG. 13A depicts exemplary capacitance results provided as a capacitance matrix by an embodiment of the present invention;

FIG. 13C depicts the results of a resistance step for a back-end-of-line (BEOL) section of an interconnect in an embodiment of the present invention;

FIG. 16 depicts an exemplary tabular-formatted display of electrical behavior data in an embodiment of the present invention.

DETAILED DESCRIPTION

Figure 1A:
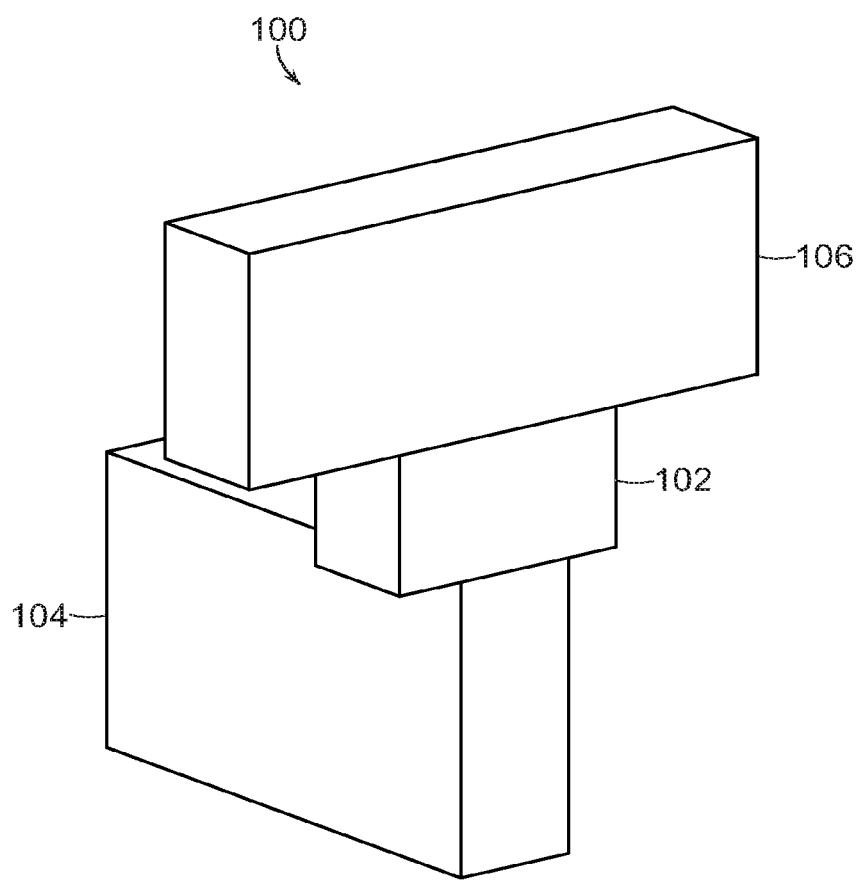
FIGS. 1A-1B (prior art) depict an exemplary solid geometry model of an interconnect stack and related mesh created from the model.

Structures built from primitive geometric objects or idealized stacking of thickened 2D layouts were appropriate when the structures were easily represented as stacked two-dimensional shapes with thickness. But in the past decade, technology development's greatest challenges have shifted from the scaling of predictable unit processes in individual 2D structures to the integration of complex process sequences used to build intricate 3D structures. The majority of development time and cost is now spent on yielding the desired physical structure in the face of proportionally larger process variation. Such structures are not easily built from primitives. In addition, since a feature on the geometry may now depend on a process parameter from a step much earlier in the process, describing the dependence of a primitive's parameter in terms of all the process parameters that precede it is not commercially feasible.

Attempts have been made to use conventional mechanical computer-aided design (CAD) tools and specialized technology CAD (Process TCAD) tools to model recent semiconductor device structures, with the goal of reducing the efforts spent on fabricating experimental wafers. General-purpose mechanical CAD tools have been found inadequate because they do not automatically mimic the material addition, removal, and modification processes that occur in an actual fab. Process TCAD tools, on the other hand, are physics-based modeling platforms that simulate material composition changes that occur during diffusion and implant processes, but not all of the material addition and removal effects that occur during other processes that comprise an integrated process flow. Typically, a 3D device structure is an input to process TCAD tools, not an output. Furthermore because of the amount of data and computations required for physics-based simulations of processes, process TCAD simulations are practically restricted to very small regions on a chip, most often encompassing just a single transistor. In state-of-the-art semiconductor fabrication technologies, most of the integration challenge concerns the interaction between processes that may be widely separated in the integrated process flow and the multiple different devices and circuits that comprise a full technology suite (transistors, resistors, capacitors, memories, etc.). As such, a different modeling platform and approach than mechanical CAD or process TCAD is required.

Virtual fabrication systems are capable of creating realistic 3D geometry to represent the result of recent semiconductor processes. In contrast to conventional CAD and process TCAD environments, a virtual fabrication environment is capable of virtually modeling an integrated process flow and predicting the complete 3D structures of all devices and circuits that comprise a full technology suite. Virtual fabrication can be described in its most simple form as combining a description of an integrated process sequence with a subject design, in the form of 2D design data (masks or layout), and producing a 3D structural model that is predictive of the result expected from a real/physical fabrication run. A 3D structural model includes the geometrically accurate 3D shapes of multiple layers of materials, implants, diffusions, etc. that comprise a chip or a portion of a chip. Virtual fabrication is done in a way that is primarily geometric, however the geometry involved is instructed by the physics of the fabrication processes. By performing the modeling at the structural level of abstraction (rather than physics-based simulations), construction of the structural models can be dramatically accelerated, enabling full technology modeling, at a circuit-level area scale. The use of a virtual fabrication environment thus provides fast verification of process assumptions, and visualization of the complex interrelationship between the integrated process sequence and the 2D design data. It will be appreciated that improvements demonstrated in the virtual fabrication environment such as those described herein will similarly improve the corresponding physical fabrication processes.

Figure 1B:
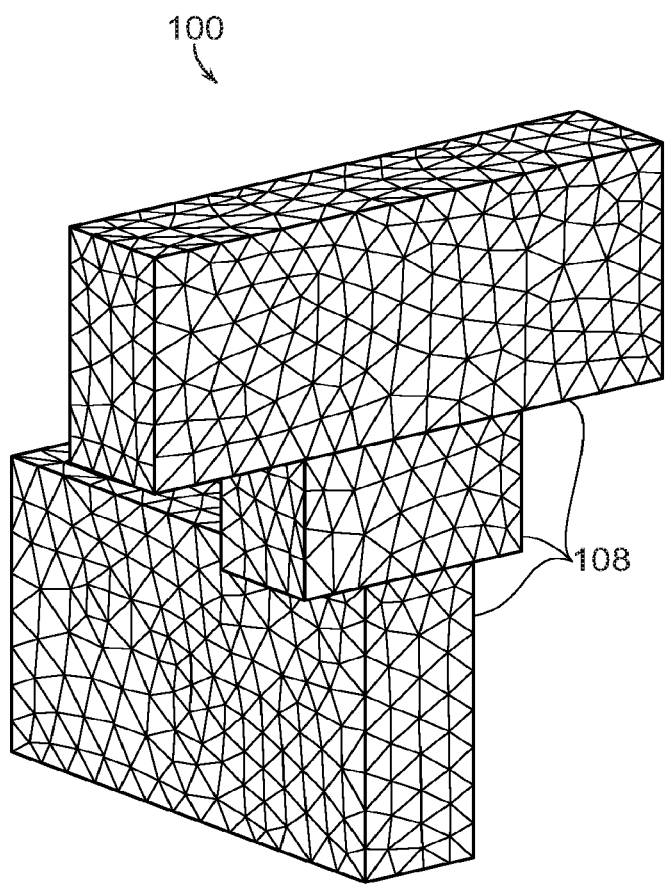
Figure 1C:
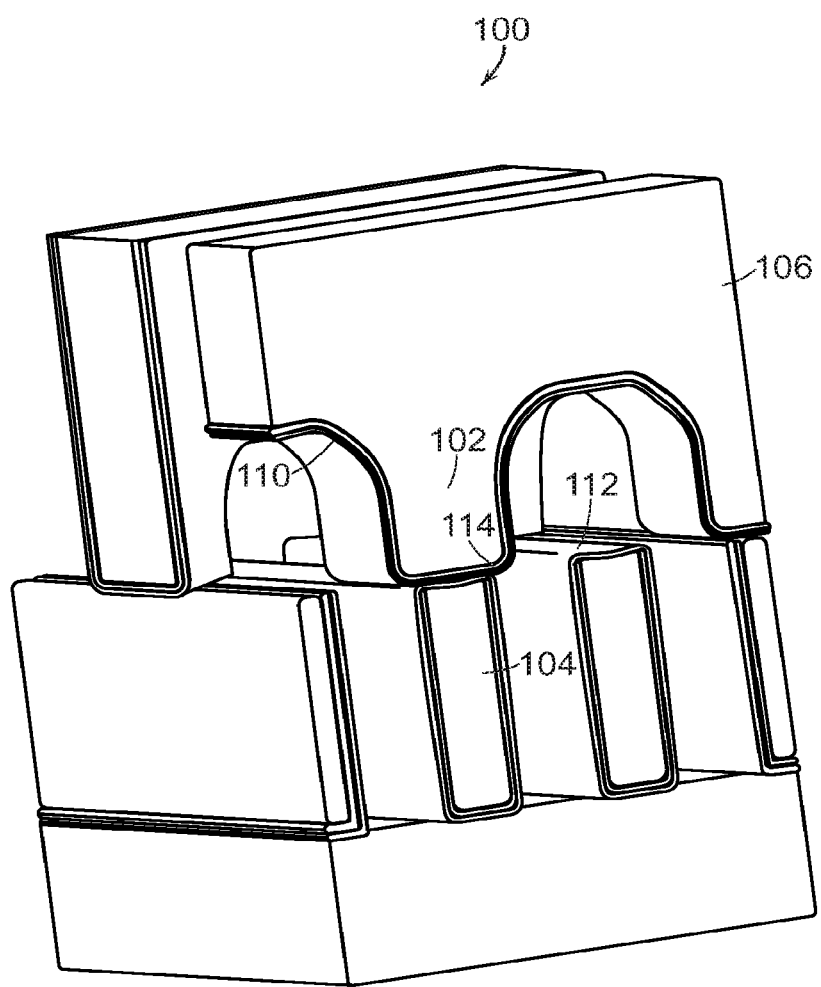
FIG. 1C depicts the interconnect stack of FIG. 1A modeled in a virtual fabrication environment.
Figure 1D:
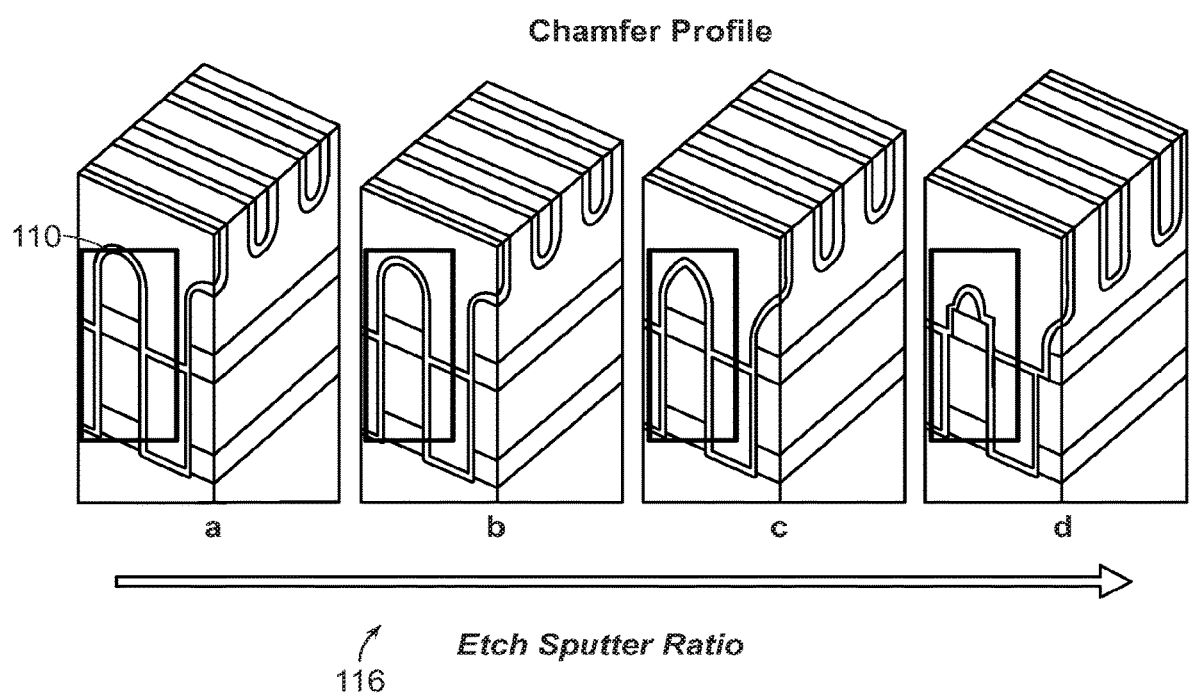
FIG. 1D depicts a sputtered corner on the interconnect stack of FIG. 1A with results controllable by a process parameter.

FIG. 1C depicts an example of virtual fabrication that models the simple interconnect stack 100 of FIG. 1A. The interconnect stack 100 of FIG. 1C includes entities 102, 104 and 106 as described previously for FIG. 1A, but also includes the sputtered corner 110 and other fine detail captured by virtual fabrication such as overetch indentation 112 (line should touch the bottom of brown ditch rather than on edge) and thin layers 114 that conformally follow an overtech process. Not only is the sputtered corner 110 more realistic, and would thus result in more accurate electrical behavior when simulated, but also, the variation in structure due to variation in the process is naturally captured. For instance, in FIG. 1D, the variation in the sputtered corner 110 is controlled by a single process parameter in virtual fabrication, the sputter ratio 116. In contrast, for geometry represented with primitives, the variation in this structure could not easily be described with simple primitive parameters.

Figure 1E:
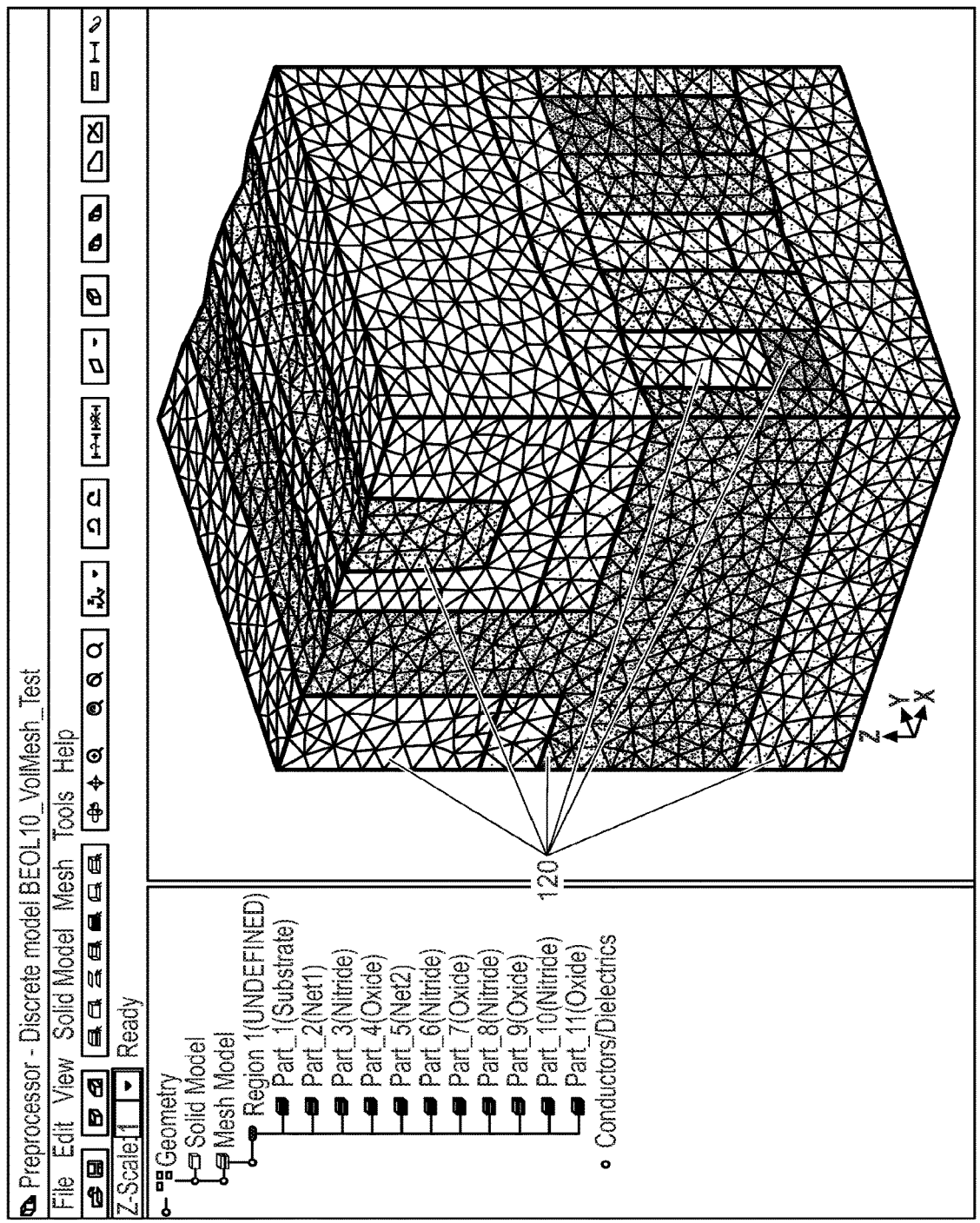
FIG. 1E depicts an exemplary mesh created from a virtual fabrication result.

Conventional electrical simulation tools can alternately take a mesh as input, rather than a solid model described with primitives. To enable electrical simulation for recent technology development, mesh elements 120 can be directly generated from the realistic geometry represented by virtual fabrication as shown in FIG. 1E. These meshes 120 can serve as the input to electrical simulation tools. However, the virtual fabrication system and the conventional electrical simulation tools are separate software systems. Meshing from a virtual fabrication tool and then importing those meshes into electrical simulation tools is therefore a manual process and prevents exploring the impact of process variation on electrical behavior. This is because analyzing process variation requires analysis of possibly thousands of different geometries generated by the virtual fabrication system, which cannot be practically done manually. In addition the export of geometry is very slow when implicit geometry (discussed further below) is used by the virtual fabrication environment to model a structure since significant computation time is required to convert the implicit geometry into a boundary-conforming mesh. Thus electrical behavior under process variation becomes even less practical.

Embodiments of the present invention enable the modeling of electrical behavior during the virtual fabrication of a semiconductor device structure. As part of the virtual fabrication system, electrical behavior can be computed without the manual process of exporting to conventional third-party electrical tools. Additionally and importantly, the computationally time consuming process of boundary-conforming mesh creation from the implicit geometry representation of a virtual fabrication process can be avoided by solving for electrical behavior on a non-boundary-conforming mesh created from the implicit geometry. Modeling the electrical behavior as part of virtual fabrication environment provides the speed and automation necessary to explore the impact of many ranges of process variation on the electrical behavior of the technology under development.

Determining electrical behavior of an integrated circuit in the most general sense involves determining the voltage and charge (or current) throughout the electronic system over the period of device operation. The larger IC electrical behavior depends on the electrical behavior of the limited number of repeated structures used millions of times to create the larger IC. During technology development, it is typically the role of those responsible for process integration or device development to develop a process that meets the electrical requirements of the technology. Characterizing the electrical behavior of a structure depends on the physical properties of the materials that compose the structure. For instance, individual transistors may be interconnected to one another with metal lines and vias where individual sections of metal are separated by one or more dielectric insulating materials. The electrical behavior of the metal interconnect and the intervening dielectric can often be characterized by the resistance, capacitance, and at times inductance as seen from the ports of the structure. A port, also called a terminal, is a region on a device where electrical current can leave or enter the device. These electrical behavior values may be solved for by numerically approximating reduced forms of Maxwell's equations which govern electromagnetic phenomenon within the structure. When a structure includes semiconducting materials, such as in a structure representing a transistor, the transport of charge is governed by the more complex physics of semiconductors and the electrical behavior may be characterized by the nonlinear current-voltage relations between the various ports.

In order to include electrical behavior modeling in a virtual fabrication environment, the environment must include numerical algorithms for computing electrical behavior between electrical ports or nets on the device geometry created by the virtual fabrication environment. As noted previously, a port, also called a terminal, is a region on a device where electrical current can leave or enter the device. A net, as explained further below, is an interconnected region of conductive material. Thus algorithms for computing electrical behavior should appropriately account for physical properties of each of the materials represented by the geometry, such as the conductivity of metals and the permittivities of dielectrics. The virtual fabrication environment should also account for the compositional changes in the materials as a result of the fabrication process such as, for example, the diffusion of dopants after implant.

In one embodiment, a virtual fabrication environments takes as input two-dimensional (2D) design data and a process sequence describing each step of the fabrication process. A 3D modeling engine is configured to produce as output a 3D structural model with an implicit geometry representation, such as a voxel-based implicit geometry representation. As described in more detail later in relation to FIG. 10B, an implicit geometry representation is one in which the interface between materials in the 3D structural model are defined without an explicit representation of the (x,y,z) coordinate locations of that interface. Embodiments allow the addition of steps in the virtual fabrication process to compute electrical behavior using an electrical behavior engine provided by the virtual fabrication environment that operates on the implicit geometry. The electrical behavior engine uses the structural model data and material composition data (such as dopant distribution) along with material properties and port and net specifications to compute as output the electrical behavior data. In one embodiment the material properties used for the computations of electrical behavior are stored in a materials file for editing in a materials editor.

Figure 2:
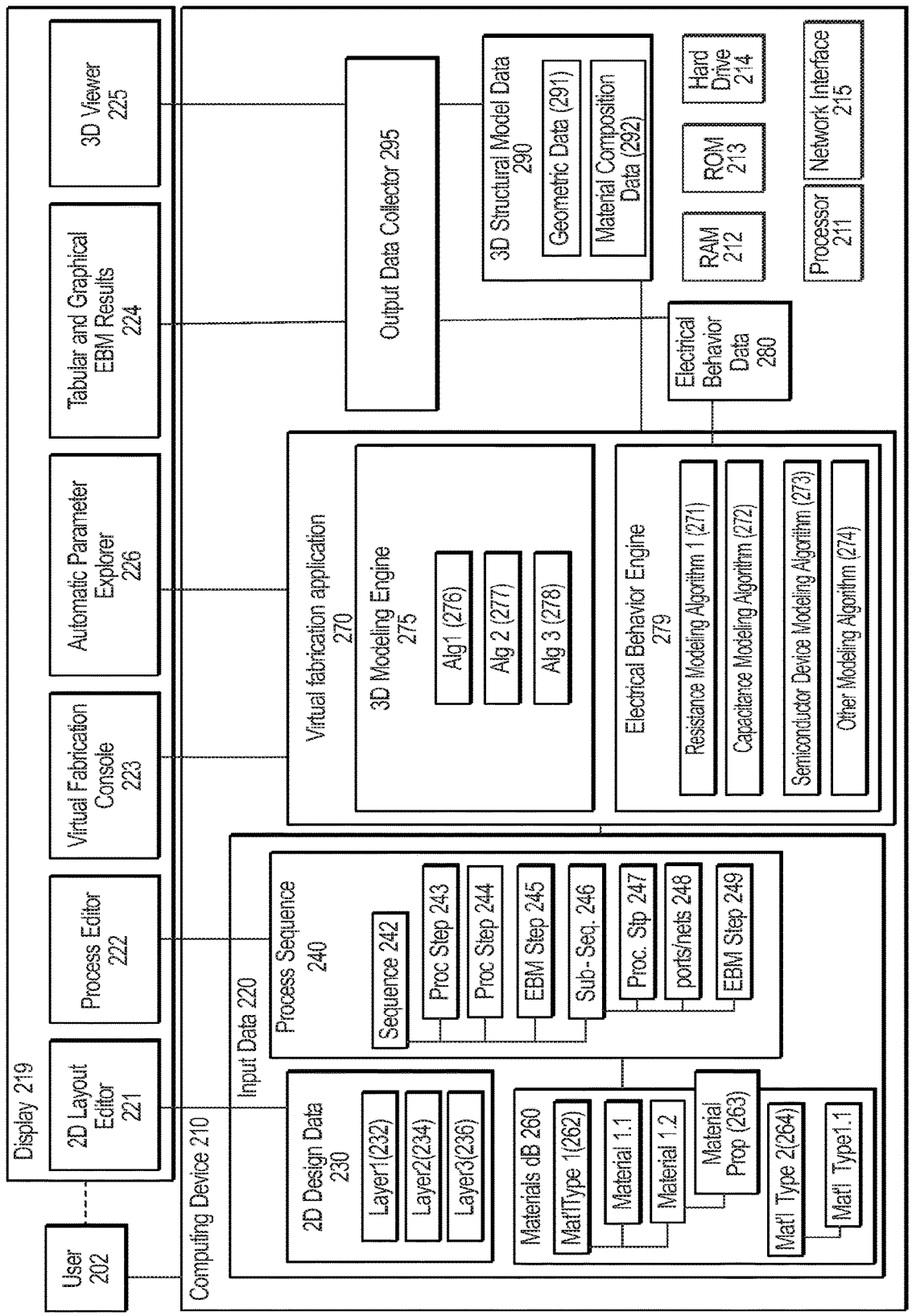
FIG. 2 depicts an exemplary virtual fabrication environment suitable for practicing an embodiment of the present invention.

FIG. 2 depicts an exemplary virtual fabrication environment 201 suitable for practicing an embodiment of the present invention. Virtual fabrication environment 201 includes a computing device 210 accessed by a user 202. Computing device 210 is in communication with a display 219. Display 219 may be a display screen that is part of computing device 210 or may be a separate display device or display surface in communication with computing device 210. Computing device 210 may be a PC, laptop computer, tablet computing device, server, or some other type of computing device equipped with a processor 211 and able to support the operations of virtual fabrication application 270, 3D modeling engine 275 and electrical behavior engine 279 (described further below). Processor 211 may have one or more cores. The computing device 210 may also include volatile and non-volatile storage such as, but not limited to, Random Access Memory (RAM) 212, Read Only Memory (ROM) 213 and hard drive 214. Computing device 210 may also be equipped with a network interface 215 so as to enable communication with other computing devices.

Computing device 210 may store and execute virtual fabrication application 270 including 3D modeling engine 275 and electrical behavior modeling engine 279. 3D modeling engine 275 may include one or more algorithms such as algorithm 1 (276), algorithm 2 (277), and algorithm 3 (278) used in virtually fabricating semiconductor device structures. Electrical behavior engine 279 may include modeling engines for performing specific types of electrical modeling such as resistance modeling 271, capacitance modeling 272, semiconductor device modeling 273, or other modeling 274 related to semiconductor fabrication such as stress/strain analysis or thermal analysis. 3D modeling engine 275 may accept input data 220 in order to perform virtual fabrication "runs" that produce semiconductor device structural model data 290. Electrical behavior engine 279 may accept input data 220 and structure model data 290 that includes geometric 291 and material composition 292 data. Virtual fabrication application 270, 3D modeling engine 275 and electrical behavior modeling engine 279 may generate a number of user interfaces and views used to create and display the results of virtual fabrication runs. For example, virtual fabrication application 270 and 3D modeling engine 275 may display layout editor 221, process editor 222 and virtual fabrication console 223 used to create virtual fabrication runs. Virtual fabrication application 270, 3D modeling engine 275 and electrical behavior modeling engine 279 may also display a tabular and graphical results view 224 and 3D view 225 for respectively displaying results of virtual fabrication runs including the results of electrical behavior modeling steps, and 3D structural models generated by the 3D modeling engine 275 during virtual fabrication of semiconductor device structures.

Input Data Description

Input data 220 includes both 2D design data 230 and process sequence 240. Process sequence 240 may be composed of multiple process steps 243, 244, 247, 248 and 249. As described further herein, process sequence 240 may also include one or more electrical behavior modeling steps 245. Process sequence 240 may further include one or more subsequences which include one or more of the process steps or electrical behavior modeling steps. 2D design data 230 includes of one or more layers such as layer 1 (232), layer 2 (234) and layer 3 (236) which may be provided in an industry-standard layout format such as GDS II (Graphical Design System version 2) or OASIS (Open Artwork System Interchange Standard).

Input data 220 may also include a materials database 260 including records of material types such as material type 1 (262) and material type 2 (264) and specific materials for each material type. Many of the process steps in a process sequence may refer to one or more materials in the materials database. Each material has a name and some attributes such as a rendering color. Each material may also have one or more material properties 263 that define its physical properties for the electrical behavior engine 279. The materials database may be stored in a separate data structure.

The 3D Modeling Engine 275 and electrical behavior modeling engine 279 use input data 220 to perform the sequence of operations/steps specified by process sequence 240. As explained further below, process sequence 240 may include one or more electrical behavior modeling steps 245, 249 that indicate a point in the process sequence during a virtual fabrication run at which a determination of electrical behavior in a designated region of a 3D structural model will be made by the electrical modeling engine 279. The designated region may be specified by identifying ports or nets 248. In one embodiment the ports or nets 248 may be manually selected by a user via a user interface provided by the virtual fabrication environment when providing parameters for an electrical behavior modeling step. The designated region may be a cell representing a portion of a larger circuit including one or more devices and/or their connecting materials. The performance of the process sequence 240 during a virtual fabrication run generates electrical behavior data 280 and 3D structural model data 290. 3D structural model data 290 may be used to generate a 3D view of the structural model of the semiconductor device structure which may be displayed in the 3D viewer 225. Electrical behavior data 280 may be processed and presented to a user 202 in the tabular and graphical electrical behavior results view 224. In one embodiment, electrical behavior data 280 and 3D structural model data 290 may be displayed to a user, at least in part, in the same view.

Because of the large number of structural dimensions that are critical to the success of an integrated technology such as semiconductor devices, finding the relationship between the many inter-related process steps used to fabricate a device structure and the created structure is critical. As structural modifications produced by a step in the process sequence may be affected by previous and subsequent steps in the sequence, a particular step may affect a structural dimension and electrical behavior in ways that are not obvious. Embodiments of the present invention provide a virtual fabrication environment that enables automatic determination of electrical behavior in designated regions of the structural device model being created. The automatic determination of electrical behavior is accomplished by specifying one or more electrical behavior modeling steps in the process sequence at a point in the process when the measurement is desired for the designated region. The output data from this electrical behavior modeling step can be used to provide quantitative comparison to other modeling results to optimize the technology (i.e. fabrication process) used to produce physical semiconductor devices of interest.

Figure 3:
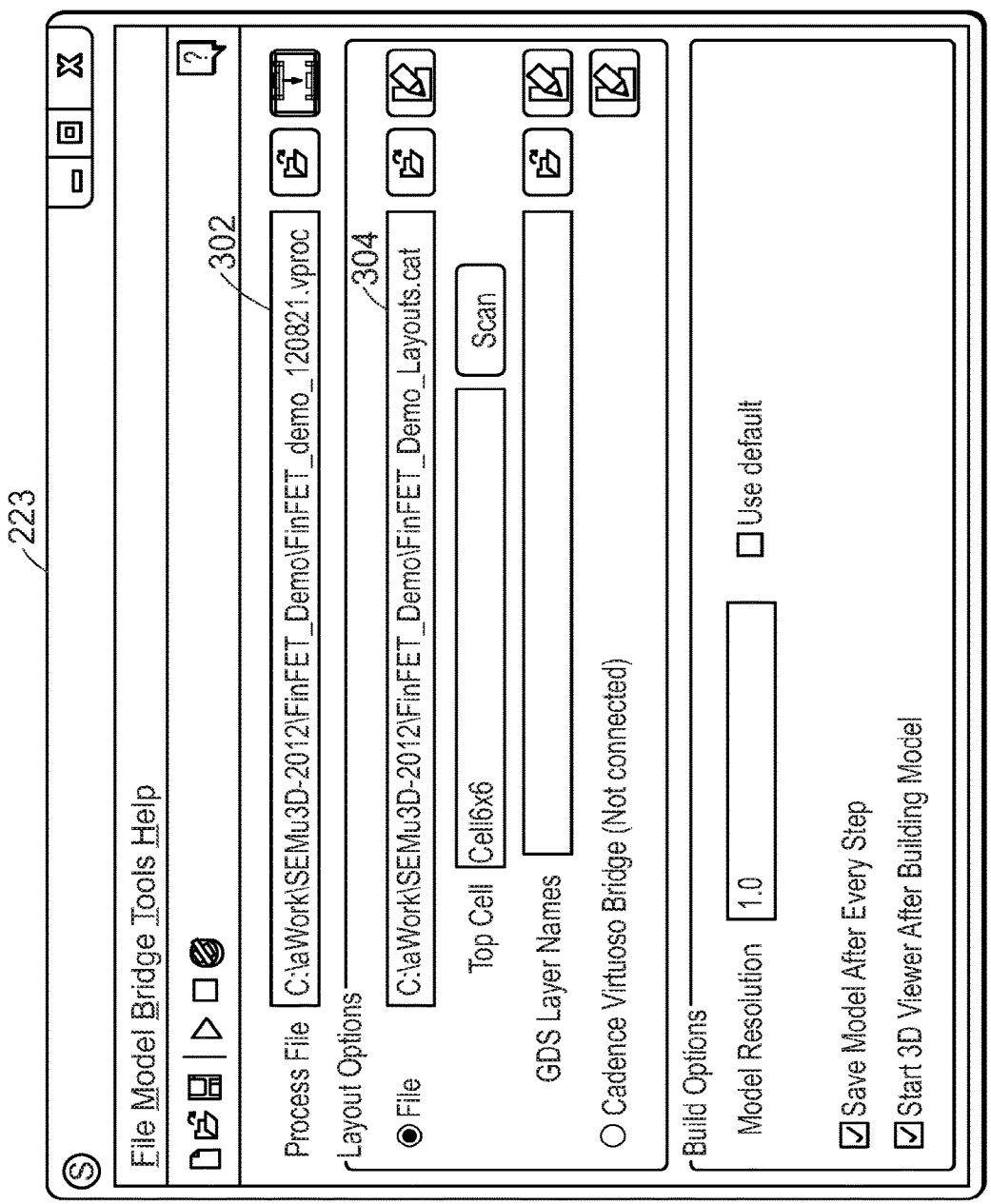
FIG. 3 depicts an exemplary virtual fabrication console utilized in an embodiment of the present invention.

FIG. 3 depicts an exemplary virtual fabrication console 223 utilized in an embodiment of the present invention to set up a virtual fabrication run. The virtual fabrication console 223 allows the user to specify files containing the process sequence 302 and the layout (2D design data) 304 for the semiconductor device structure that is being virtually fabricated. It should be appreciated however that the virtual fabrication console can also be a text-based scripting console that provides the user with a means of entering scripting commands that specify the required input and initiate building of a structural model, or building a set of structural models corresponding to a range of parameter values for specific steps in the process sequence. The latter case is considered a virtual experiment and is discussed further below.

Figure 4:
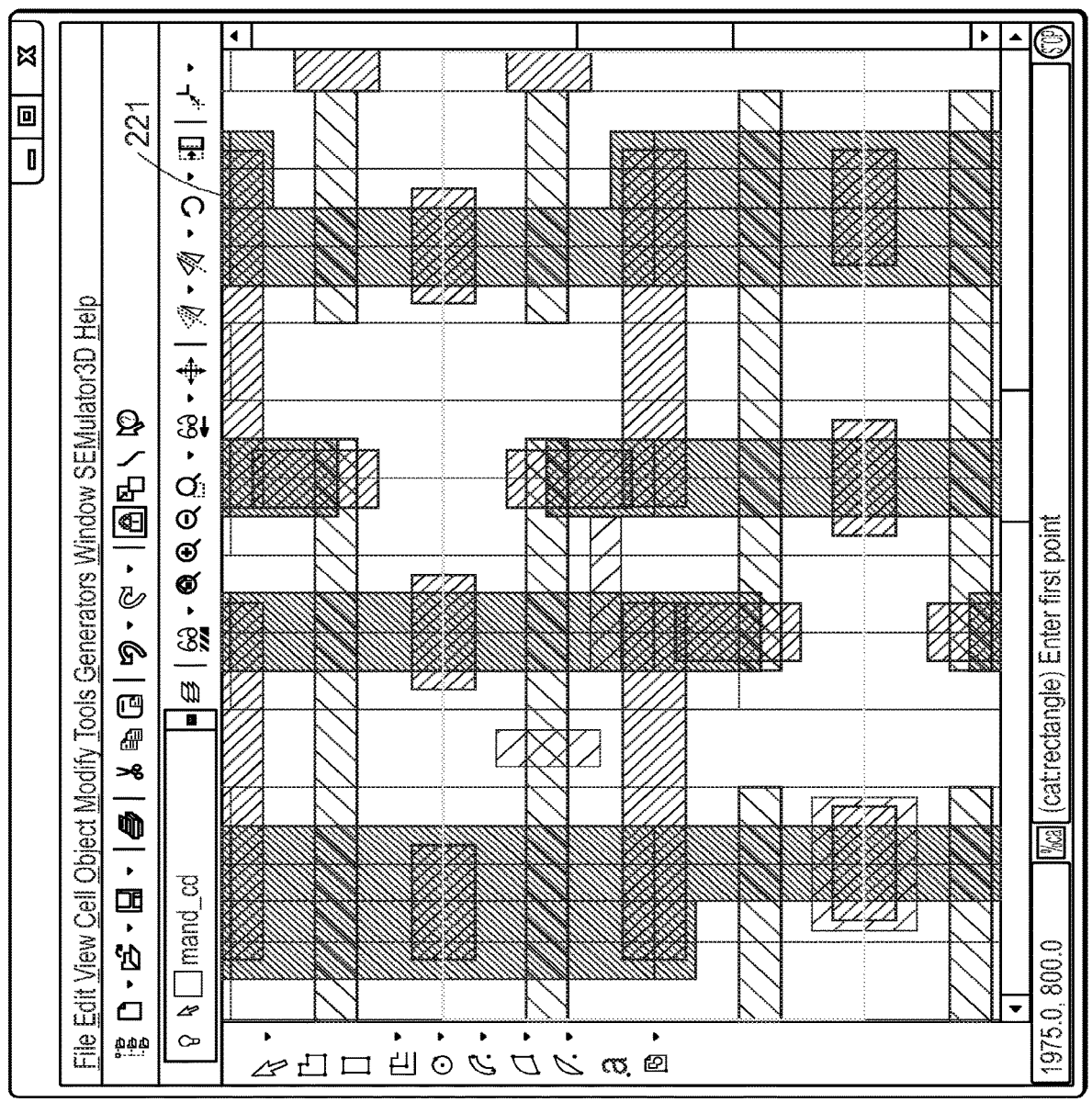
FIG. 4 depicts an exemplary layout editor utilized in an embodiment of the present invention.

FIG. 4 depicts an exemplary layout editor 221 utilized in an embodiment of the present invention. The layout editor 221 displays the 2D design layout specified by the user in the virtual fabrication console. In the layout editor, color may be used to depict different layers in the design data. Areas enclosed by shapes or polygons on each layer may represent regions where a photoresist coating on a wafer may be either exposed to light or protected from light during a photolithography step in the integrated process flow. The shapes on one or more layers may be combined (booleaned) to form a mask that is used in a photolithography step. The layout editor 221 provides a means of inserting, deleting and modifying a polygon on layers, and of inserting, deleting or modifying layers within the 2D design data The design data is used in combination with the process data and materials database to build a 3D structural model.

FIG. 5 depicts an exemplary process editor 222 utilized in an embodiment of the present invention. The user defines a process sequence in the process editor. The process sequence is an ordered list of process steps conducted in order to virtually fabricate the user's selected structure. The process editor may be a text editor, such that each line or group of lines corresponds to a process step, or a specialized graphical user interface such as is depicted in FIG. 5. The process sequence may be hierarchical, meaning process steps may be grouped into sub-sequences and sub-sequences of sub-sequences, etc. Generally, each step in the process sequence corresponds to an actual step in a physical fabrication environment. For instance, a sub-sequence for a reactive ion etch operation might include the steps of spinning on photo resist, patterning the resist, and performing the etch operation. The user specifies parameters for each step or sub-step that are appropriate to the operation type. Some of the parameters are references to materials in the materials database and layers in the 2D design data. For example, the parameters for a deposit operation primitive are the material being deposited, the nominal thickness of the deposit and the anisotropy or ratio of growth in the lateral direction versus the vertical direction. This deposit operation primitive can be used to model actual processes such as chemical vapor deposition (CVD). Similarly, the parameters for an etch operation primitive are a mask name (from the design data), a depth of etch, a list of materials affected by the operation, and the anisotropy in etch rates of the different materials.

There may be hundreds of steps in the process sequence and the process sequence may include sub-sequences. For example, as depicted in FIG. 5, a process sequence 510 may include a subsequence 512 made up of multiple process steps. The process steps may be selected from a library of available process steps. For a selected step, the process editor 500 enables a user to specify all required parameters. For example, a user may be able to select a material 520 from a list of materials in the material database and specify a process parameter 522 for the material's use in a selected process step.

Figure 6B:
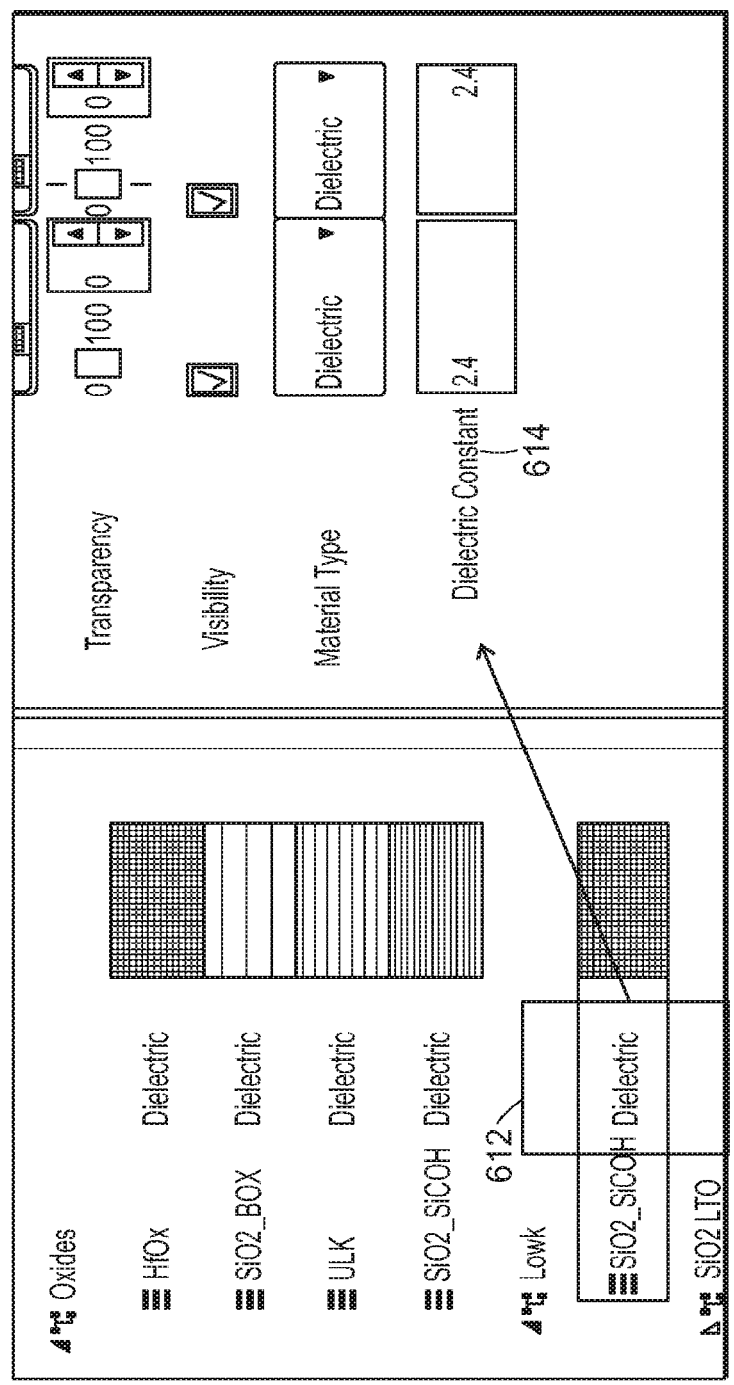
FIG. 6B depicts an exemplary material selection in a capacitance modeling step performed by an embodiment.

The selected material 520 may have physical material properties 263 necessary for simulation of the electrical behavior. For instance, as shown in FIG. 6A, the user may select that the material Cu (copper) is a type of conductor 602 with bulk resistivity 604 of 1.68e-6 Ohm-cm and a non-zero contact resistivity 606 between two materials (value not shown). These values would be relevant for instance, for a resistance modeling step. Similarly, FIG. 6B shows that a material SiCOH is of type dielectric 612 and has a dielectric permittivity 614 of 2.4 relative to the permittivity of free space. This value would be relevant for instance, for a capacitance modeling step.

Figure 7A:
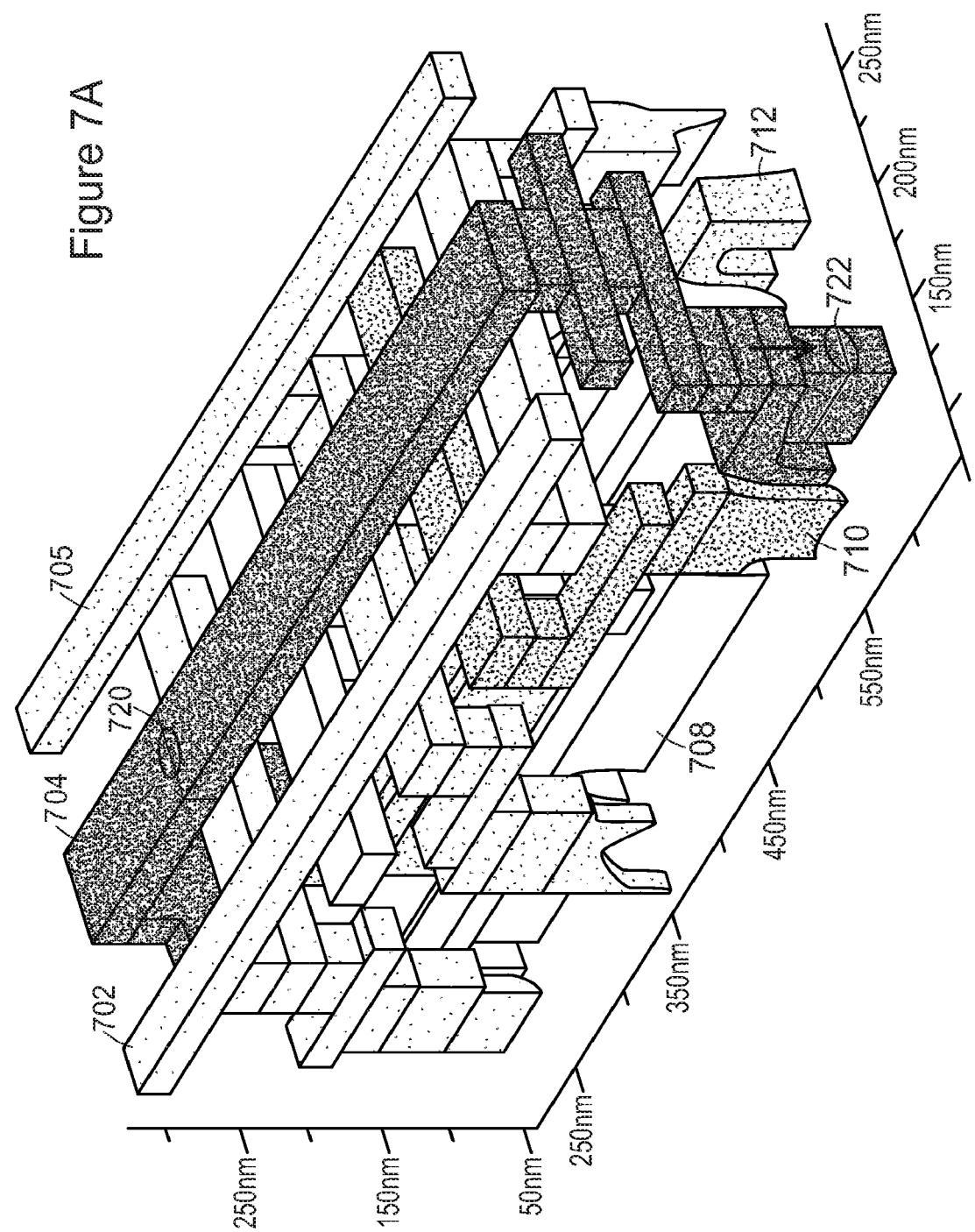
FIG. 7A depicts an exemplary 3D view in which a 3D structural model has been automatically divided into electrical nets for performance of an electrical behavior modeling step in an embodiment of the present invention.

Some steps in the process sequence may be used to identify regions in the 3D virtual fabrication model that are relevant to electrical behavior modeling. In one embodiment the 3D modeling engine may automatically divide the partially built 3D structural model into electrical 'nets' of connected conductive material. These nets may, for instance, connect ports for individual devices such as transistors, capacitors, resistors, memory etc. that are located in the designated region of the 3D structural model. For example, in FIG. 7A, an exemplary 3D view of the middle-of-line (MOL) and back-end-of-line (BEOL) interconnect for an SRAM cell has been divided into electrical nets 702, 704, 705, 708, 710 and 712.

Figure 7B:
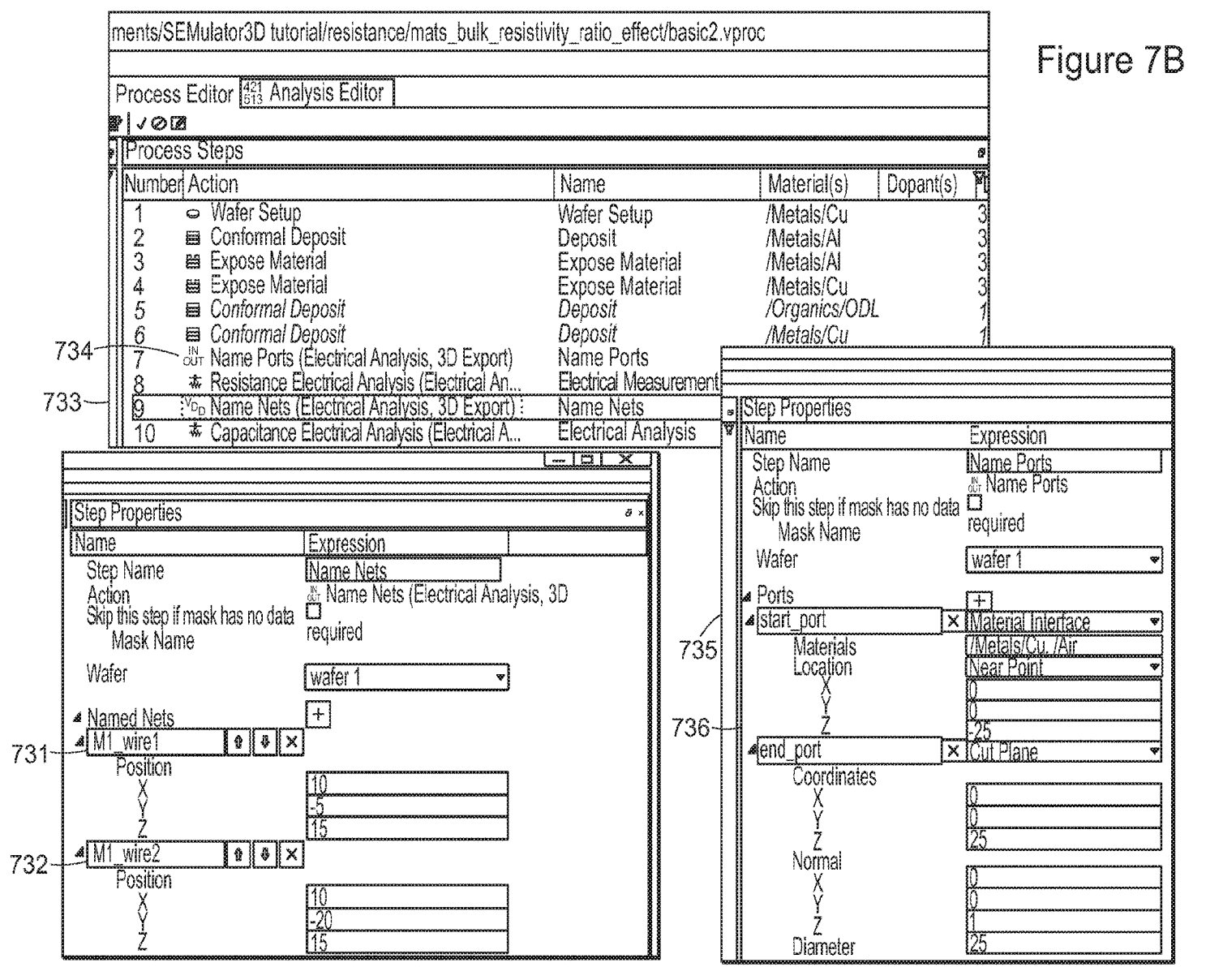

The automatically identified nets can be named for reference in a later electrical behavior step using a net identification process step 48. FIG. 7B illustrates a Name Nets step 733 which names net "M1_wire1" 731 and net "M2_wire2" 732 based on an (x,y,z) location within the net.

In one embodiment, a user may be able to specify each port for an electrical behavior calculation through a port identification selection 734. The port may be specified as the surface where a conductor crosses a model boundary, as the junction between different conducting materials 735 or as an arbitrary user-specified surface within a conducting material, such as a cut-plane 736. For example, in FIG. 7A, the lines 720 and 722 mark two cut-planes through net 704. These surfaces may be used, for instance, as the ports for a resistance calculation. Similarly, in FIG. 7C the three regions 741, 742, and 743 identify the source, gate, and drain ports of a FinFET device. This identification is necessary for the semiconductor device behavior modeling of the FinFET.

It will be appreciated that other manual or programmatic mechanisms for identifying nets and ports to the process sequence that do not rely upon a process editor and/or do not specify cut planes or material interfaces to specify ports are also within the scope of the present invention. For example, a user may specify the cut plane or material interface for a port by adding an object to the 2D layout at a specific (x,y) location and use the location of the port identification selection 734 within the virtual fabrication flow to identify the z-location. In another example, a user may select a location on a previously built 3D model to choose an identifying location for the port or net.

One or more steps in the process sequence may be electrical behavior modeling steps inserted by a user. By inserting the electrical behavior modeling steps directly in the fabrication sequence, the embodiment of the present invention allows electrical behavior to be determined for designated regions of a structure being fabricated at critical points of interest during the fabrication process. As the many steps in the virtual fabrication interact in the creation of the final structure, the ability to determine electrical behavior occurring in desired model regions, at one or more different points in the integrated process flow, is of great interest to the process developer and structure designer.

In one embodiment, the electrical behavior modeling step may be a resistance solving step. The resistance solving step is added to the process sequence at a specified point in the process sequence for a designated region of the 3D semiconductor device structure model being built. For example, resistance may be determined for a selected region of an IC being virtually fabricated that includes a number of transistors and interconnects. In one embodiment, resistance may be determined for a portion of the interconnect material (the conductive/semiconductive material) connecting the ports of the individual devices in the model. In most situations, the resistance solving step will be added to the process sequence at a point in the sequence and for a location specified by a user via the process editor. It will be appreciated that other manual or programmatic mechanisms for adding the resistance solving step to the process sequence that do not rely upon a process editor are also within the scope of the present invention.

FIG. 7D shows an example of the parameters of a resistance solving step that specifies that resistance be calculated for the conducting paths within the 3D model that start at port "start_port" 751 and end at port "end_port" 752 where these ports were defined by a previous port identification step as described previously.

It should be appreciated that other parameters other than those specifically discussed herein may also be specified by the user for the resistance solving step or another type of electrical behavior modeling step without departing from the scope of the present invention.

In one embodiment, the electrical behavior modeling step may be a capacitance solving step. The capacitance solving step is added to the process sequence at a specified point in the process sequence for a designated region of the 3D semiconductor device structure model being built. In an embodiment, the capacitance solver calculates capacitance between electrical nets as will be detailed below.

In most situations, the capacitance solving step will be added to the process sequence at a point in the sequence via the process editor. It will be appreciated that other manual or programmatic mechanisms for adding the capacitance solving step to the process sequence that do not rely upon a process editor are also within the scope of the present invention.

FIG. 8 depicts two exemplary 3D views of a semiconductor device structure undergoing a virtual fabrication process that includes a capacitance solving step in an embodiment. The view on the left 802 depicts materials (minus some dielectrics that are hidden) while the view on the right 804 depicts the model separated into electrical nets. The geometry of the nets and intervening dielectric materials between the nets are utilized in the capacitance solve.

Figure 9A:
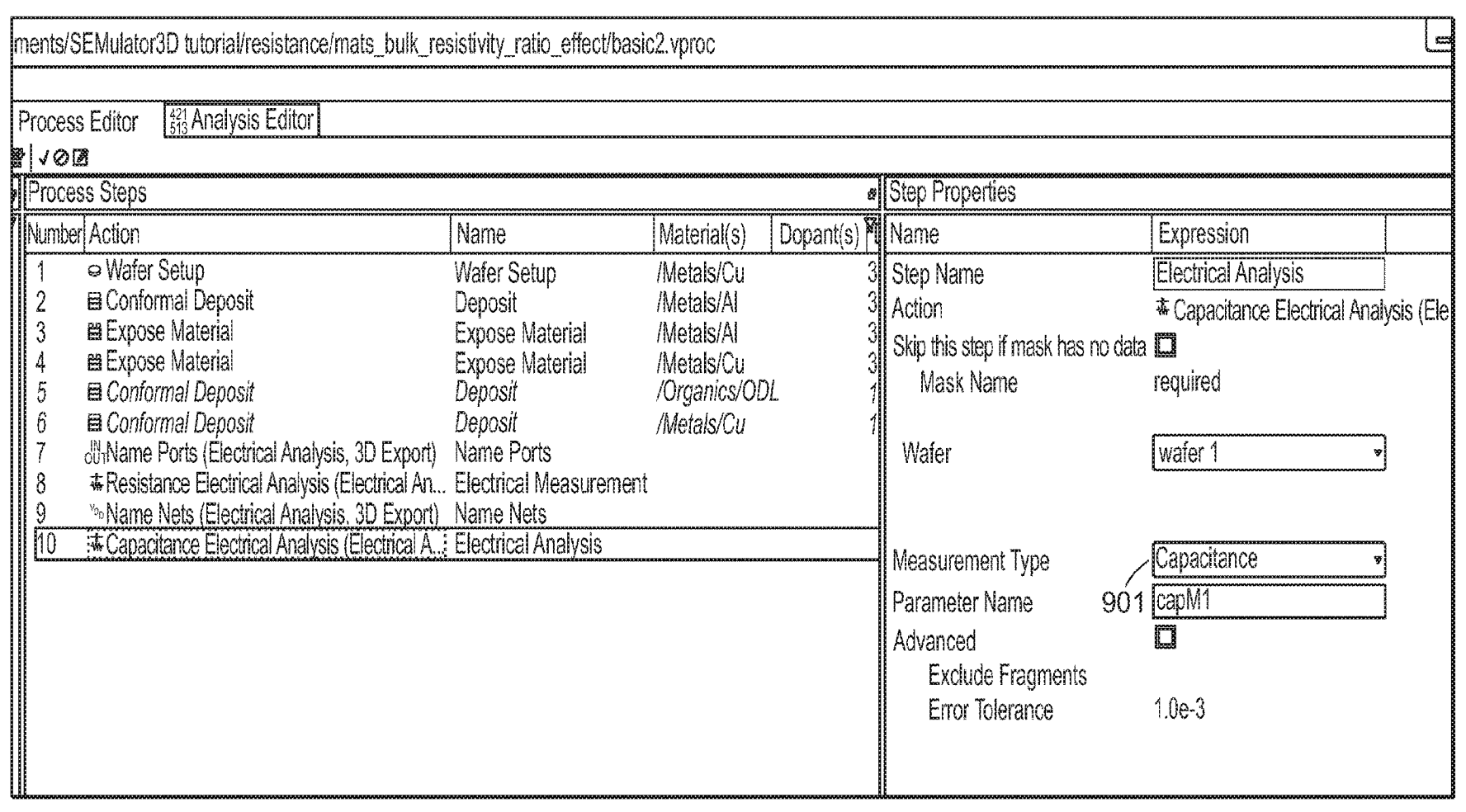

FIG. 9A depicts an exemplary process editor configured to allow a user to set parameters for a capacitance solving step. In this example, a capacitance step 901 is requested which in this example will find the capacitance between all the nets in the 3D model built up to that point in the process sequence. While not shown, it is understood that another option is for a user to choose a subset of the nets within the model for the capacitance calculation. It will be appreciated that other parameters may also be specified by the user for the capacitance solving step without departing from the scope of the present invention It should be appreciated that input data 220 that is relevant for electrical behavior modeling may be specified in a means other than through a process editor or process description. It may, for instance, be specified programmatically through a script language interface. It may also be specified through a separate data structure for steps related to actions requesting simulation or measurement on the 3D data structure, rather than physical process changes to the 3D structure. FIG. 9B illustrates the concept of an analysis editor for representing electrical behavior and other measurements 910 that are to occur at various steps 912 in the process sequence.

In one embodiment, rather than being listed as part of the process sequence, the electrical behavior modeling step is specified separately from the process sequence and references the step or steps in the process sequence which its performance should follow. For example, in one embodiment, the electrical behavior modeling step may be received via a separate analysis editor that references the steps of the process sequence.

The virtual fabrication application 270 passes the above described input data 220 to the electrical behavior engine 279 along with the geometric data 291 and material composition changes 292 for the 3D model as up to the current point in the process sequence. The engine 279 executes the user-requested electrical behavior algorithm which computes the appropriate electrical behavior output.

Electrical Behavior Engine Description

Algorithms for solving for electrical behavior approximate the solution to the relevant governing partial differential equations within the structure. The governing equations relate the potential, also called the voltage, to the charge carriers, whose motion is the current. For instance, the resistance, R, of the conducting material between two ports is represented by ratio of the voltage, V, between the ports to the current, I, that passes through the ports, R=V/I. This ratio can be computed by solving for the potential, ϕ, in the following partial differential equation (PDE) in the conducting volume:

$$\nabla \cdot (\sigma \nabla \phi) = 0$$

where σ is the bulk conductivity (σ=1/ρ where ρ is the bulk resistivity) of the materials in the volume. Since the conductor can be composed of multiple materials, σ is a function of position, σ(x), where x is a position in the volume, and σ(x) is the bulk conductivity of the material at position x. Bulk conductivity represents the relation between current density, J, and electric field, E, J=σE=σ∇ϕ in conducting materials such as metals. Complex physical phenomenon at the interface between two materials may be represented with an interface resistivity, $\sigma_c$, also called a contact resistivity. Current flowing through a small area, dA of interface area must see an equivalent resistance, $dR=\sigma_c dA$. For problems with more than 2 ports, the definition of resistance, R, can be extended to be an n×n matrix R where n is the number of ports. R is then defined as V=RI, where now V and I are vectors of length n.

The static behavior of charge carriers when there is no conducting path between the ports is characterized by the capacitance. The entirety of each net, which is the union of all the conducting material that is part of a conducting path to each port, rises to the same voltage as the port and charge collects on surface of each net. The relation between charge and current is the capacitance, Q=CV where Q is a vector of length n of total electrical charge on each net where n is the number of nets, V is a vector of voltages for each net, and C is an n×n capacitance matrix. Because the position of the port on the net is not relevant in capacitance calculation, the relation for capacitance is between the nets of the structure rather than the ports. The capacitance matrix can be determined by solving for the potential, $\phi$, in the volume of the dielectric material between the conducting nets $$\nabla \cdot (\epsilon \nabla \phi) = 0$$

where $\epsilon=\epsilon(x)$ is the dielectric permittivity of the dielectric material at position x within the volume of dielectric material.

Figure 10A:
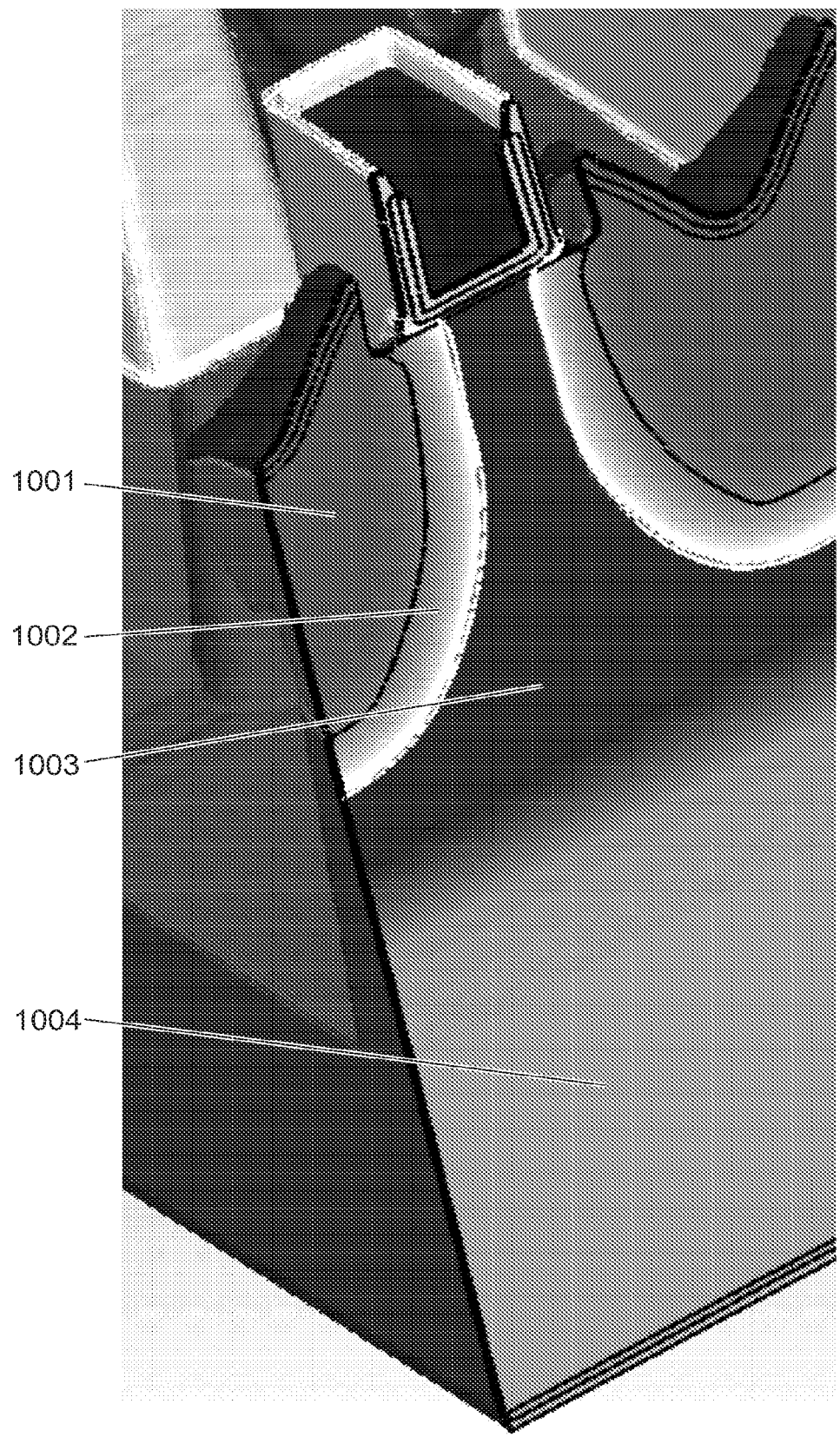
FIG. 10A depicts dopant concentration changes in a cross-section of a FinFET device being modeled in an embodiment of the present invention.

The above PDEs for resistance and capacitance are derived from the full Maxwell equations governing electrodynamics. Separate resistance and capacitance are valuable for understanding, for instance, the impact of structure changes on delay and cross-talk of signals for circuits designed with the technology under development. Similar governing PDEs are well-known to capture electrical behavior beyond resistance and capacitance. For instance, understanding the detailed charging time of the storage node of a dynamic random access memory (DRAM) cell may be modeled with a partial differential equation (PDE) that combines the conductive effects within conductors with the charging at the conductor-dielectric interfaces. Similarly, electrical behavior when inductance is important may include terms for modeling the magnetic field, and the modeling of optical and radio-frequency (RF) structures may involve solution of full electrodynamics. In semiconducting materials, the motion of charge carriers is more complex than for the resistance modeling in metals. For example, the steady-state behavior can be modeled in certain circumstances with the drift-diffusion model $$0 = \nabla \cdot J_n - (R-G)$$

$$0 = \nabla \cdot J_p - (R-G)$$

$$\nabla \cdot (\epsilon \nabla \phi) = \rho$$

where Jn and Jp are the carrier current density of electrons and holes, respectively, $\rho$ is the net charge from carriers in the volume, and (R-G) represents the recombination and generation of electrons and holes. Jn, Jp, $\rho$, R, and G are functions of the unknown carrier densities, n and p, and the potential, phi. Solving this PDE determines the carrier densities and potential from which the current-voltage relationships at the ports can be determined. Important for the above electrical simulation with semiconductors is the dopant concentrations in the material which can vary over the fabrication process. This material composition change is illustrated in FIG. 10A which shows a cross-section of the FinFET device shown in FIG. 7C shaded according to dopant concentration. The original dopant concentration 1004 of the p-type semiconductor wafer was the original concentration of all the original silicon material. A dopant implant process step increased the p-type doping in the channel 1003, an epitaxial growth process step grew a new material of n-type doping for the source and drain 1001, and a diffusion step moved some of those n-type dopants in the source drain toward the channel 1002.

To solve the above PDEs to determine electrical behavior, the electrical behavior engine 279 uses the locations of the different materials in the volume of the 3D modeling domain. This information is included in the geometric data 291. Many conventional electrical simulation tools work with geometric data based on primitives or based on explicit geometric entities that indicate the boundaries between different materials. Those skilled in the art will recognize this by the term "boundary representation" or B-rep used by many standard solid modeling software packages across many science and engineering disciplines. For instance with conventional tools, each of the three entities that make up 102, 104, and 106 of FIG. 1A might be represented and stored in a data structure with six entries, one for each of the six flat rectangular surfaces that make up each of the three solids. Each surface might be represented by a data structure that stores an equation for the plane of the surface and stores the loop of four edges that bound the rectangular face. In turn, each edge is represented by a data structure that stores an equation for the line and stores its two vertices, and each vertex is represented by a data structure holding its (x,y,z) location in space. Such representations have extremely high accuracy at little cost in complexity. For instance, they can represent certain structures exactly, such as the smooth surfaces required for aerodynamic design of an airplane wing. In addition, common transformations are readily represented, such as rotation and scaling, as well as basic operations to cut or combine with other structures. Another example of a boundary representation would be an interconnected set of 2D primitive shapes, such as triangles, that cover the boundary surfaces of each material and interface surfaces between materials. For instance, the triangles on the surfaces shown in FIG. 1B by themselves (not as part of tetrahedra) would be a representation of the interfaces between materials and between the solid and air. The set of surface triangles and their interconnection is also called a surface mesh.

Electrical simulation tools require a volume mesh to be generated from some form of explicit boundary representation and previous solutions exist for creating a volume mesh of B-rep geometry as shown in FIG. 1A or from surface meshes. Such volume meshes for finite-element or finite-volume simulation techniques will preserve the location of the interface between materials to a high level of accuracy which can translate into high accuracy of electrical behavior simulation. Such a volume mesh is called a boundary-conforming mesh or simply a conformal mesh. A key feature of such a mesh is that no element crosses the boundary between materials. In other words, if FIG. 1B is viewed as a volume mesh of tetrahedral elements, then each element is wholly within one material and thus no tetrahedron contains more than one material.

However, neither B-rep and similar solid modeling kernels, nor surface mesh representations are optimal for virtual fabrication. Solid modeling kernels generally rely on a large number of heuristic rules to deal with various geometric situations, and modeling operations may fail when the heuristic rules do not properly anticipate a situation. Aspects of semiconductor structural modeling that cause problems for B-rep solid modeling kernels and surface meshes include the very thin layers produced by deposition processes and the propagation of etch fronts that results in merging faces and/or fragmentation of geometry. Geometry representations that instead represent the boundaries implicitly do not suffer from these problems. A virtual fabrication system that uses an implicit representation exclusively thus has significant advantages, even if it may not represent the interfaces as accurately as B-rep. One type of implicit geometry representation uses voxels. Voxels are essentially 3D pixels. Each voxel is a cube of the same size, and may contain one or more materials, or no materials.

Figure 10B:
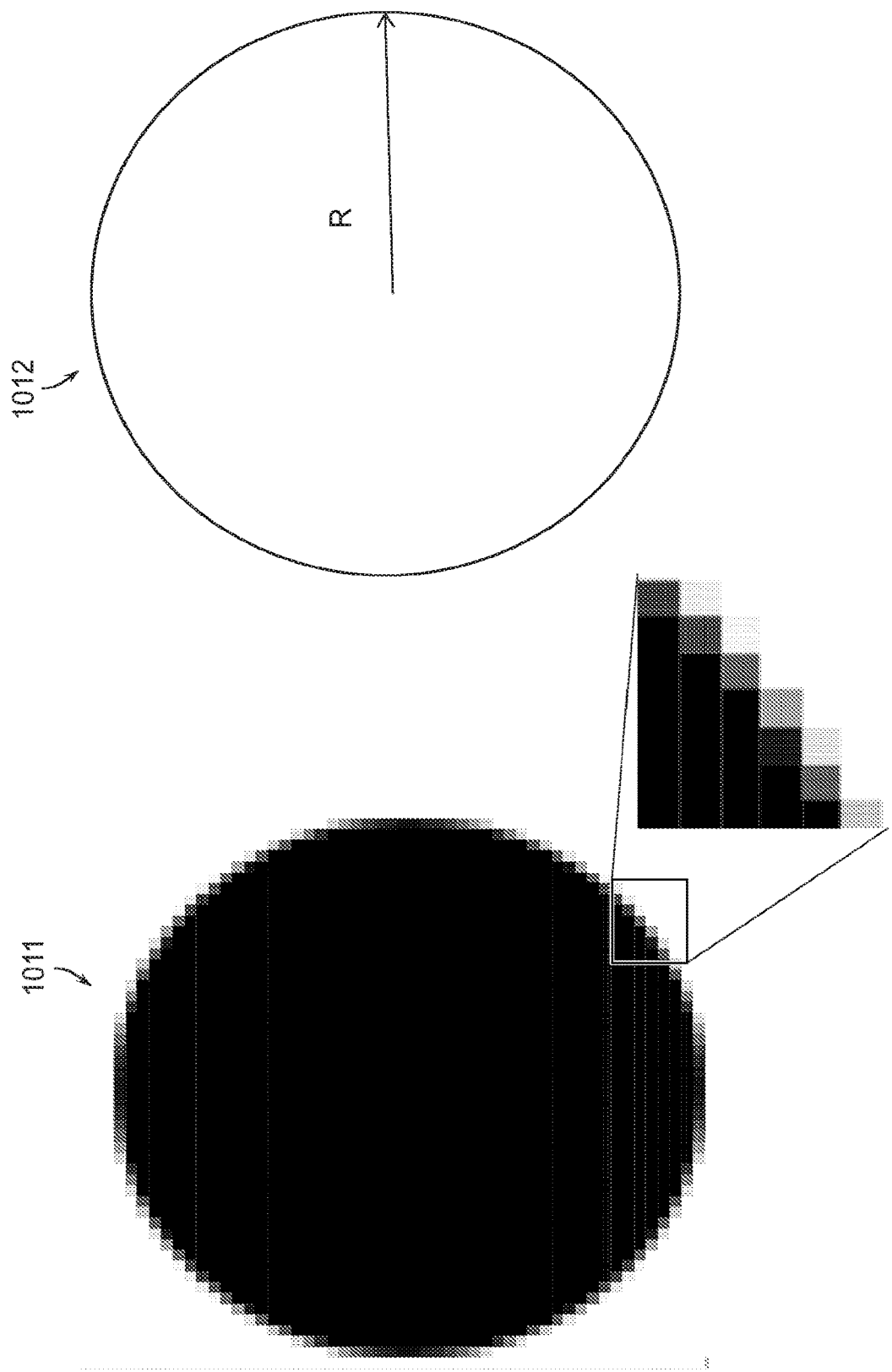
FIG. 10B depicts exemplary representations of interfaces between materials in an embodiment.

Geometric data represented with voxels implicitly represents the interface between materials. FIG. 10B illustrates this concept in two dimensions for a circle. A B-rep representation 1012 may represent the circle as the equation of a circle with radius R with material 1 inside the circle with material 2 outside. A voxel representation of the circle 1011 is an array of cubes where each cube stores the material identification numbers within it, and the relative amounts of each material. The grayscale darkness of the squares in 1011 indicate the relative percentage of material 1 versus material 2. Black indicates 100% material 1 and 0% material 2, and white indicates 0% material 1 and 100% material 2. Since the circle cuts through the voxels along its path, grayscale voxels on the boundary of the circle are partially filled with each material and the darkness of gray indicates the fill fraction. Partially filled voxels indicate that the boundary crosses through that voxel, but does not indicate where and with what orientation. The fill fractions of a boundary voxel and others in its neighborhood may be used to determine the boundary explicitly. While the determined boundary could then be used to generate a conformal volume mesh of the geometry, it would take considerable computation time which is non-desirable in the virtual fabrication environment.

In one embodiment, the 3D modeling engine 75 represents the underlying structural model in the form of voxels and the voxel representation may be used directly as a non-conformal mesh for electrical behavior simulation. Each voxel may be one cubic volume element in the mesh, but unlike a conformal mesh, an element can contain multiple materials based on the fill fractions of the voxel. Using this non-conformal mesh directly for simulation avoids the expensive step of explicit boundary representation and conformal mesh generation. To perform electrical behavior modeling simulation, in one embodiment, numerical methods such as the finite-volume or finite-difference method are adapted to account for the implicit boundaries of voxel representations. It is appreciated that other numerical methods could be applied within the scope of the present invention. Similarly, while the above example is for a regular grid of voxels with one cubic element per voxel, it should be appreciated that other alternative representations are possible, including, without limitation, using other organizations of voxels, generating more than one mesh element per voxel, representing many voxels by one mesh element, and/or using grid elements that are not cubic or not axis-aligned. For example, the virtual fabrication engine may achieve better structure accuracy if the voxels are smaller in regions near material interfaces. Similarly, the electrical simulation may achieve better electrical behavior accuracy if the elements are smaller in regions of rapidly changing fields. These regions needing different sized voxels versus elements may not coincide, and thus for accuracy and speed, a regular grid and a one-to-one voxel to element correspondence is not desired.

The governing PDEs for electrical behavior modeling and numerical methods for solving them require knowledge of the material properties and material composition data at all positions within the geometry. For a non-conformal mesh, this information is known exactly only for elements that derive from non-boundary voxels, but must be approximated for elements that derive from voxels with multiple materials (boundary voxels). For instance, for the resistance computation, the bulk conductivity, $\alpha(x)$, must be known for all positions, x, within the geometry as described previously. The bulk resistivity (and thus the conductivity) is known for each material as specified in the Material Properties 63 and thus depends on which material is at position x. If x is located on a voxel fully filled with one material, the bulk resistivity is known. For voxels that are partially filled on the boundary, this value must be approximated from the multiple materials within the voxel. In one embodiment, material properties at a location within the geometry are approximated using the properties of the majority material within each voxel. For instance if a boundary voxel is more than 50% of material 2 in circle 1011, then the bulk resistivity of material 2 is used for all values of x within that voxel, and similarly voxels of 50% or more of material 1 use bulk resistivity of material 1. This is equivalent to filling those voxels full of the majority material as shown in FIG. 10C, circle 1021. This approach incurs what is called 'staircasing' error in the solution over methods that explicitly know the boundary location, and thus know precisely the material at each location, x. One method to compensate for staircasing error is to decrease the size of each voxel when performing the virtual fabrication of the 3D model and thus reduce the volume of boundary voxels. For instance, circle portion 1022 is part of the circle of the voxel representation in 1011, and circle portion 1023 is the same part of the circle built with voxels one half of the size in each dimension. The volume taken up by boundary voxels is much less with the smaller voxel size and thus the error would be less. However, decreasing the voxel size greatly increases both the virtual fabrication computation time as well as the electrical behavior simulation time which is often unacceptable.

Numerical techniques may be employed to mitigate staircasing effects in order to achieve more accurate simulation results. One approach to achieve improved accuracy uses "effective" or combined material properties in mesh elements which contain more than one material. Careful choice of effective material properties in the virtual fabrication environment may result in reduced or minimized computational error. A wide variety of algorithms which calculate effective material properties in elements containing more than one material will be known to those skilled in the art and may be utilized within the scope of the present invention. In one embodiment, the virtual fabrication environment calculates a volume-weighted average of the material properties in mesh elements which contain more than one material to reduce staircasing effects and improve numerical accuracy in the electrical behavior simulation. In another embodiment, the virtual fabrication environment calculates effective material properties in mesh elements which contain more than one material using an algorithm which minimizes computational error in the electrical behavior simulation. In another embodiment, the virtual fabrication environment calculates effective permittivities for boundary elements at the interface between two different dielectric materials in a capacitance calculation. In another embodiment, the virtual fabrication environment calculates effective conductivities for boundary elements at the interface between two different conductive materials in a resistance calculation. For example, techniques described in Ahmad Mohammadi, Hamid Nadgaran, and Mario Agio, "Contour-path effective permittivities for the two-dimensional finite-difference time-domain method," Opt. Express 13, 10367-10381 (2005) can be used to determine effective permittivities for boundary voxels at the interface between two different dielectric materials in a capacitance computation.

As an illustrative example of the effectiveness of the use of voxel-based implicit representations in a virtual fabrication environment, FIG. 10D depicts a cross-sectional slice of two concentric spherical shells, 1032 and 1033 with a first dielectric 1031 and second dielectric 1036 between the shells. Concentric spherical shells 1032 and 1033 are composed of conducting material and form two electrical nets between which the capacitance is calculated in this example. A plot 1035 depicts the determined error in the capacitance as the voxel size is increased when using an effective permittivity method between 1031 and 1036 and a numerical solution technique as described herein. Model resolution is the size of the voxels in each dimension. Less than 1% capacitance error is achieved for a model resolution of 3, which gives an inner net 1033 that is 6 times coarser than the circle 1011 shown in FIG. 10B. This technique therefore provides high accuracy in results for such a coarse representation of the geometry, thereby leading to faster electrical behavior computation time in the virtual fabrication environment.

It should be appreciated that similar techniques work with other implicit geometry representations. One such alternative implicit geometry representation is a distance field. Distance fields are used extensively in both physical modeling and computer graphics algorithms to model a moving interface. A distance field is a scalar field whose magnitude and sign represent the distance and relationship to the geometry surface being modeled. The geometry surface is implicitly defined as an iso-contour of the distance field. The same effective permittivity concept described above may be applied in the distance field representation in cell which intersect the iso-contour by finding the volume interior to the distance field iso-contour.

In an embodiment, with material properties specified for each point x within the domain, numerical methods can be applied to solve the appropriate PDE. By choosing the center of the voxels as grid points of a finite difference numerical scheme, the material properties or material composition data within each voxel is associated with each grid point. Conceptually similar, each voxel can be chosen as a finite-volume cell where the flux that crosses voxel surfaces is conserved.

For example in an embodiment that includes a capacitance solving algorithm 272, a capacitance process step would request that the electrical behavior engine determine dielectric permittivities for each voxel based on the material properties 263 of the material or materials within each voxel of the 3D modeling domain. The electrical behavior engine would then execute the capacitance solving algorithm 272. In an embodiment that uses the finite difference numerical method to solve the capacitance PDE described previously, an unknown value of the potential, $\phi$, is associated with the center of each voxel and an equation similar to the following equation is enforced for each voxel on the interior:

$$\epsilon_{i,j,k}(\phi_{i-1,j,k}+\phi_{i+1,j,k}+\phi_{i,j-1,k}+\phi_{i,j+1,k}+\phi_{i,j,k+1}-6\phi_{i,j,k}$$

where $\phi_{i,j,k}$ and $\epsilon_{i,j,k}$ are the potential and dielectric permittivity, respectively, at voxel with index (i,j,k). In this example equation, the permittivity is assumed to be constant in all seven of the referenced voxels (with a value of $\epsilon_{i,j,k}$). For voxels that are part of a net, rather than the dielectric, the potential is specified and is not an unknown value. The large linear system of all the equations for each voxel can be solved by standard techniques, such as the conjugate gradient method, to determine the potential at every voxel. The normal derivative of the potential at the net/dielectric interface can be used to compute the charge density whose integral is the net charge, Q. For a 2-net capacitance calculation, the terms of the capacitance matrix are $C=Q/(V_1-V_2)$ where $V_1=1$ is the specified value of the potential on net 1 and $V_2=0$ on net 2.

Other methods in addition to the finite difference method may be similarly adapted to the voxel representation without departing from the scope of the present invention. Finite-difference and other numerical techniques may also be adapted to the voxel representation for the resistance algorithm 271, the semiconductor device algorithm 273, and other electrical and non-electrical algorithms 274 within the scope of this invention. For instance, it is common to apply a finite-volume method to solve the drift-diffusion equations of semiconductor device behavior.

Execution and Output Description

Figure 11:
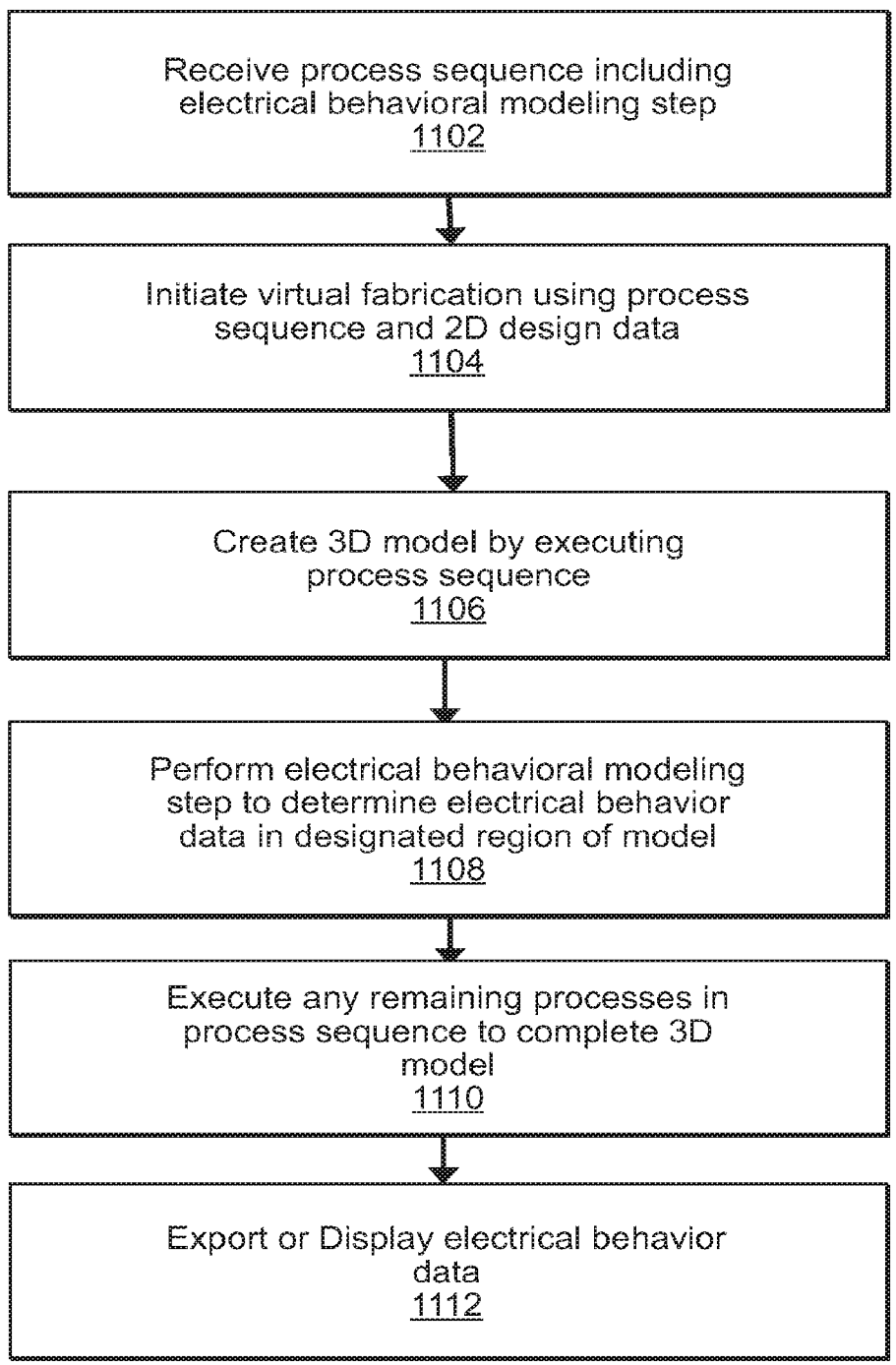
FIG. 11 depicts an exemplary sequence of steps followed by an embodiment of the present invention to perform an electrical behavior modeling step in a virtual fabrication environment.

FIG. 11 depicts an exemplary sequence of steps followed by an embodiment to execute an electrical behavior modeling step during virtual fabrication of a semiconductor device structure. A virtual fabrication environment is configured to allow a user to select from among multiple pre-existing sets of 2D design data files used in creating different semiconductor device structures. For example the user may choose among data for a FinFET, a passive resistor, a memory cell or an entire IC for virtual fabrication. Alternatively, the user may create the semiconductor device design data. The sequence begins with the virtual fabrication environment receiving a process sequence for fabricating the selected semiconductor device structure that includes an electrical behavior modeling step (step 1102). For example, the user may enter a process sequence for the selected device structure using a process editor provided by the virtual fabrication environment. In the process editor, the user may insert one or more electrical behavior modeling steps in the process sequence that specify a point during the virtual fabrication that the user would like the electrical behavior modeling steps to execute at designated locations in the evolving structure. In one embodiment, the user may enter and/or select parameters for each of the steps in the process sequence, including the electrical behavior modeling step, via the process editor. Alternatively, the parameters for the steps in the process sequence may be programmatically provided.

Figure 12:
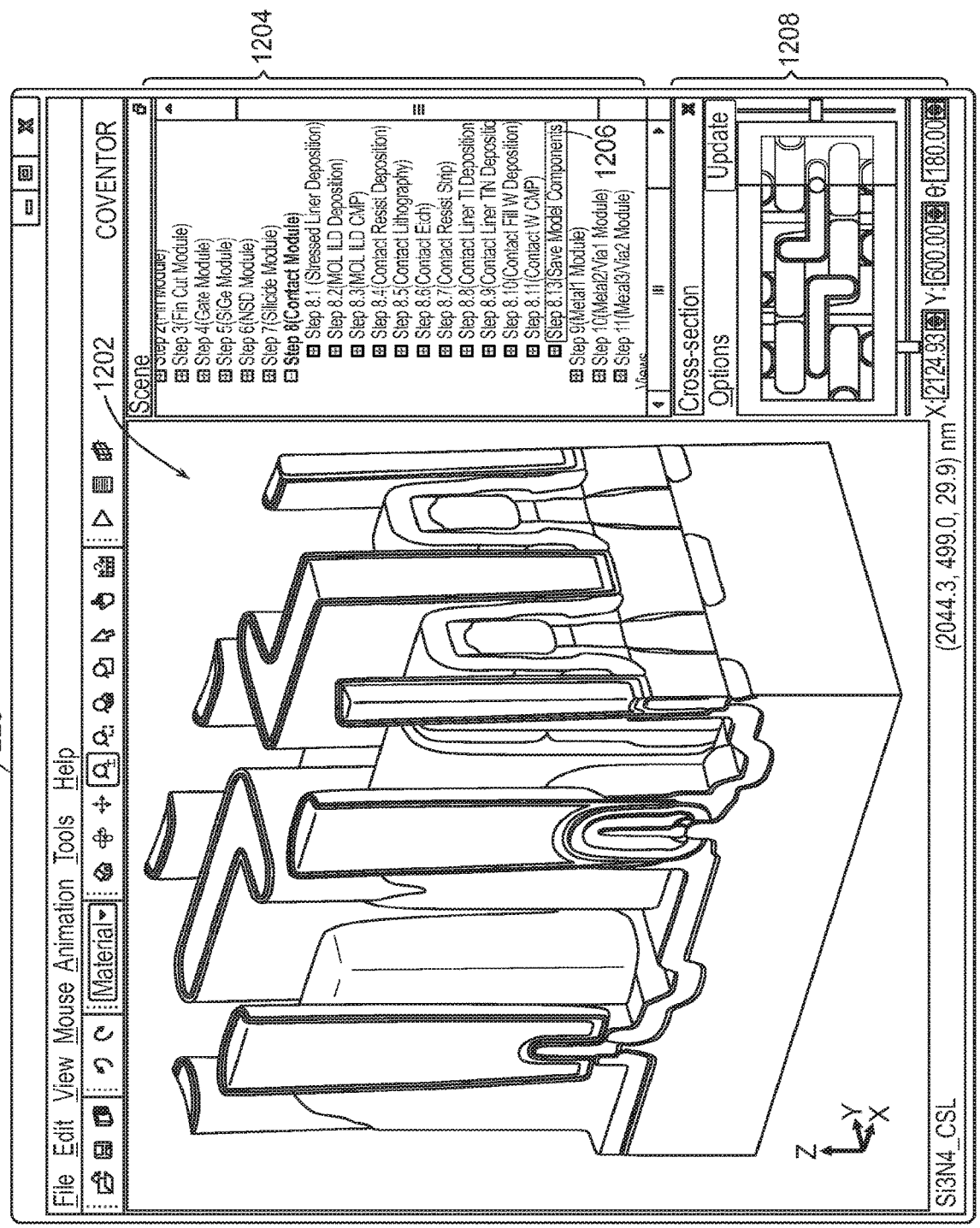
FIG. 12 depicts an exemplary 3D view utilized in an embodiment of the present invention.

The virtual fabrication run for the selected semiconductor device structure is initiated using the process sequence and associated 2D design data (step 1104). The process steps in the process sequence 40 are performed in the order specified by the 3D modeling engine 75 and builds a 3D structural model (step 1006). As noted previously, the 3D structural model may be displayed. For example, FIG. 12 depicts an exemplary 3D viewer 225 utilized in an embodiment of the present invention. The 3D viewer 225 may include a 3D view canvas 1202 for displaying 3D models generated by the 3D modeling engine 275. The 3D viewer 225 may display saved states 1204 in the process sequence and allow a particular state to be selected 1206 and appear in the 3D view canvas 1202. The 3D Viewer provides functionality such as zoom in/out, rotation, translation, cross section, etc. Optionally, the user may activate a cross section view in the 3D view canvas 1202 and manipulate the location of the cross section using a miniature top view 1208.

Continuing with the discussion of FIG. 11, when the virtual fabrication reaches the electrical behavior modeling step, the requested electrical behavior for the designated region of the partially built 3D structural model is determined (step 1108). For example, the electrical behavior modeling step may be a resistance solving step determining resistance values of an interconnect between multiple designated ports. As another non-limiting example, the electrical behavior modeling step may be a capacitance solving step determining capacitance values of electrical nets in the model. It will be appreciated that other types of electrical behavior modeling steps are also within the scope of the present invention.

The 3D modeling engine may export or display the electrical behavior data generated by the electrical behavior modeling step (step 1112). The electrical data may be displayed to a user in the 3D viewer 125 along with the a depiction of the current state of the 3D structural model at one or more points in the process sequence. The 3D modeling engine may also export the electrical behavior data. For example, the electrical behavior data 80 may be exported to an automatic data analysis tool for further processing or may be displayed to a user through a user interface such as the tabular and electrical behavior modeling results view 224 or other view.

Figure 13B:
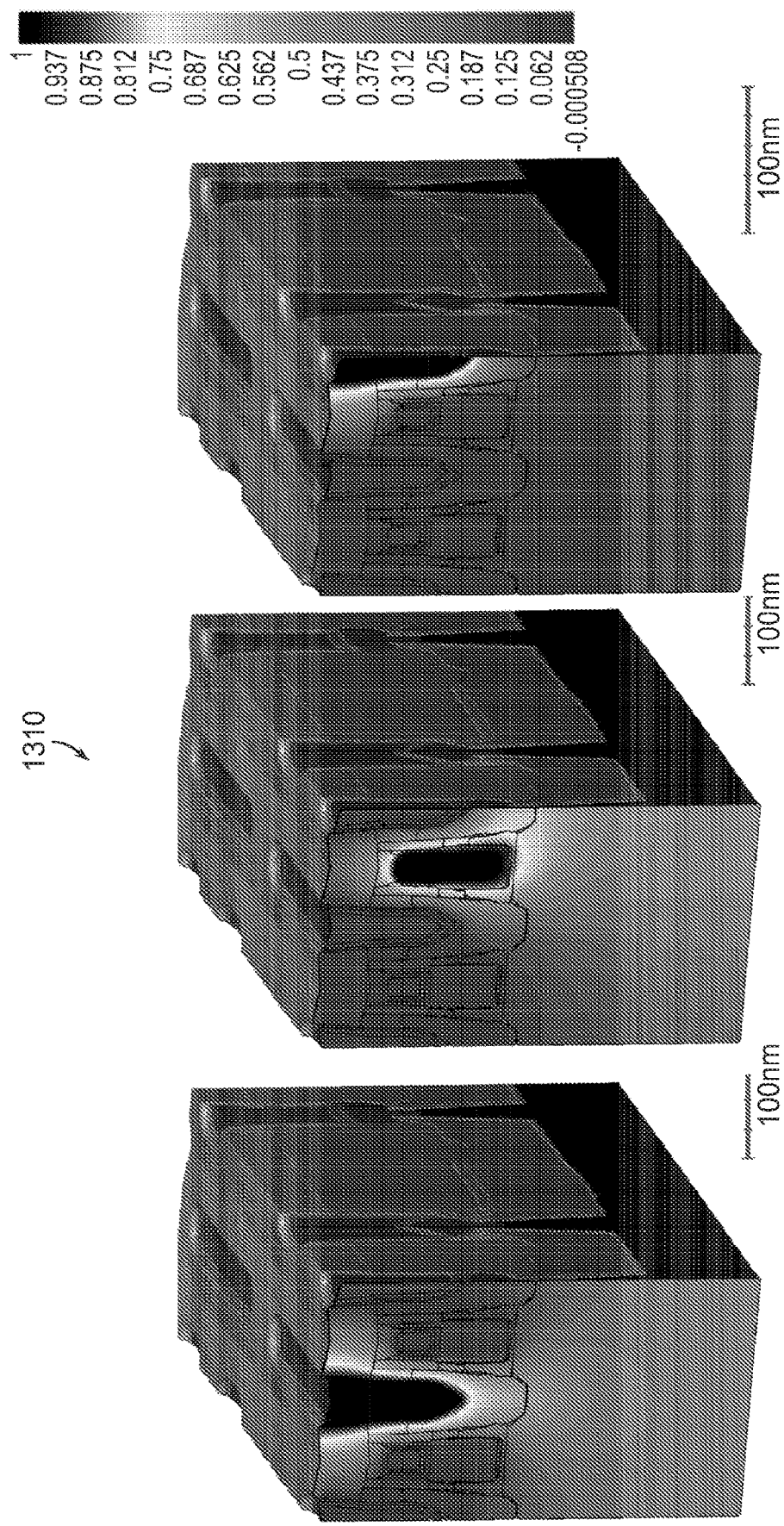
FIG. 13B depicts exemplary capacitance results provided in a 3D view by an embodiment of the present invention.

In one embodiment, depicted in FIG. 13A, the capacitance step results may be provided as a capacitance matrix, 1301, of capacitance values between the electrical nets e0 through e6. Structures that produce larger than expected values in this matrix lead to excessive circuit delay or cross-talk and those structures would need to be avoided in the final technology. To understand the structural origin of the unexpectedly high capacitance, the results may be provided in a 3D view where the shading indicates the values of the potential, $\phi$, within the 3D structural model as depicted in FIG. 13B. Regions where the potential changes significantly over a short distance indicate regions that contribute significantly to the capacitance, thus allowing users to pinpoint the structural origin of the large capacitance. With the origin identified, the appropriate change in the process can then be made to reduce the excessive capacitance and improve circuit performance.

In another embodiment that includes a resistance step, the results may be provided as a resistance matrix for a multiport resistance problem, or a single resistance for a 2-port resistance calculation. Structures with excessive resistance may lead to, for instance, excessive circuit delay. To understand the structural origin of unexpectedly high resistance, the resistance behavior results may be provided in a 3D view where the shading indicates the magnitude of the current density, J, within the 3D structural model. Areas with excessive current density may indicate regions that contribute to the high resistance. They also may indicate areas of concern for electromigration. FIG. 13C depicts the results of a resistance step for M1-V1-M2 back-end-of-line (BEOL) section of interconnect 1321. The section 1322 depicts that the structure consists of material copper (Cu) and two liner layers of tantalum (Ta) and tantalum-nitride (TaN). Each material has its own bulk resistivity specified as a material property 263. Effective resistivities are determined for each voxel, the electrical behavior engine executes the resistance algorithm and the resulting current density, J, is shown in the 3D view 1323, and potential 1324. The total resistance 1325 is also reported which is useful, for instance, in understanding the impact on circuit delay.

Figure 7C:
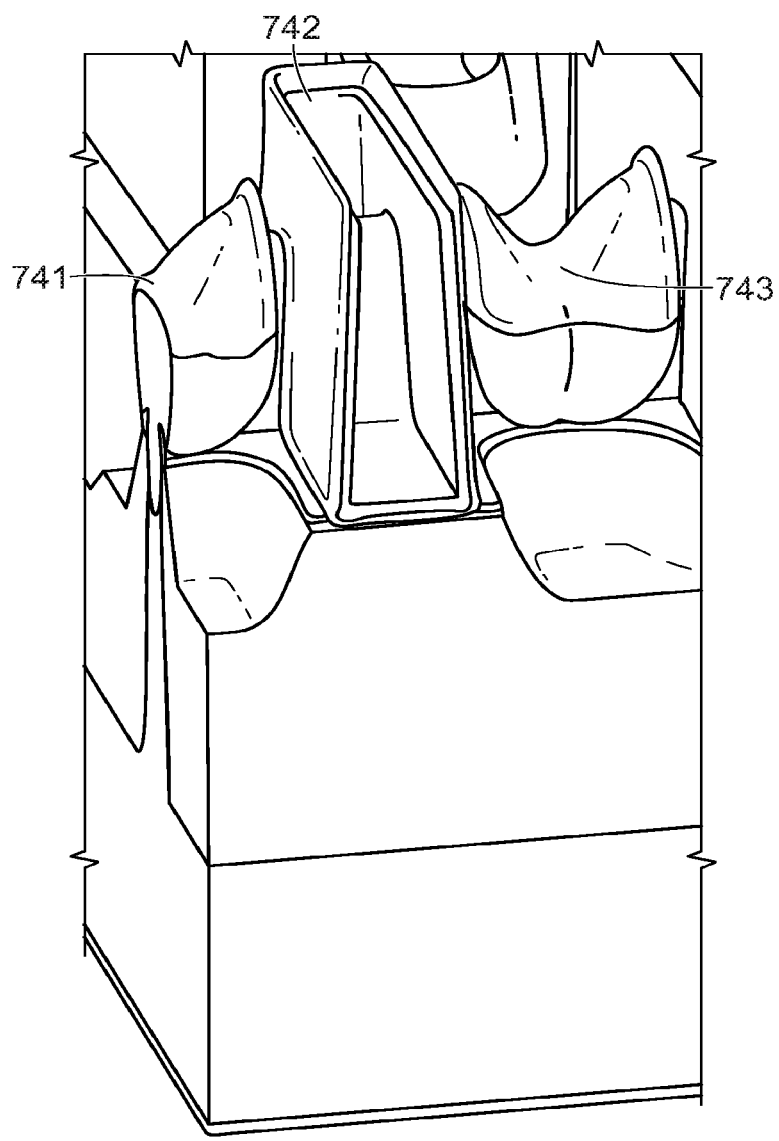
FIG. 7C depicts an identified source, gate and drain regions in a FinFET being modeled in an embodiment.

In another embodiment that includes a semiconductor device simulation step, the results may be provided as a series of current versus voltage two-dimensional plots representing the electrical behavior between the source, drain, and gate ports of a transistor. For instance, if the semiconductor device is a FinFET as shown in FIG. 7C that is part of a logic gate, then the relation between the gate voltage and drain current as shown in plot 1341 in FIG. 13E represents the effectiveness of the transistor as a switch. The results depicted in FIG. 13E indicate how well the voltage on the gate port can control the current that flows between the drain and source ports. For this embodiment, 3D visualization of the electric field and current density as was shown for capacitance and resistance may also be utilized to understand the impact of structure on the details of the fields and current flow.

Figure 13D:
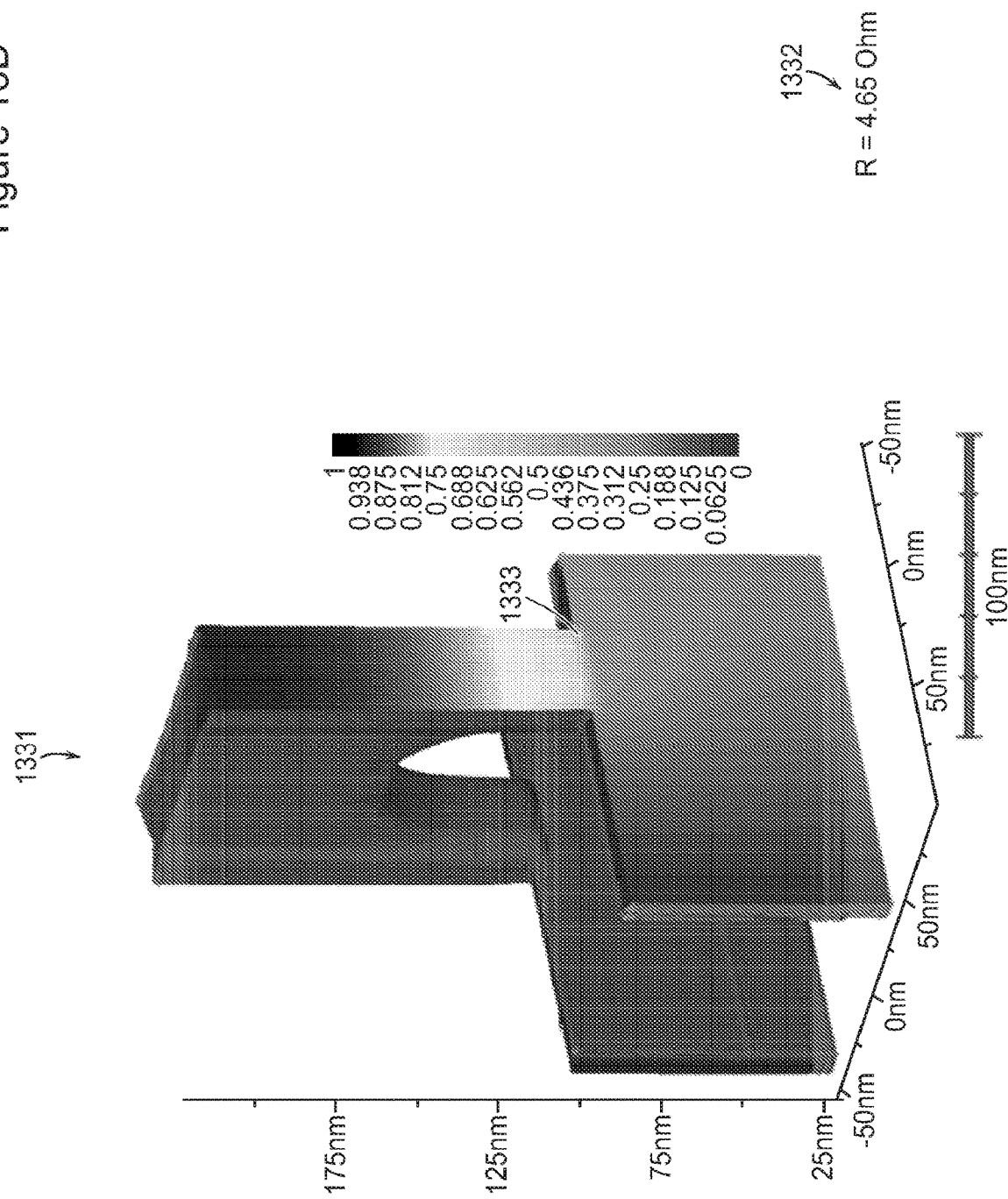
FIG. 13D depicts exemplary results from a resistance solving step accounting for non-zero contact resistivity that are displayed in a 3D view in an embodiment.
Figure 13E:
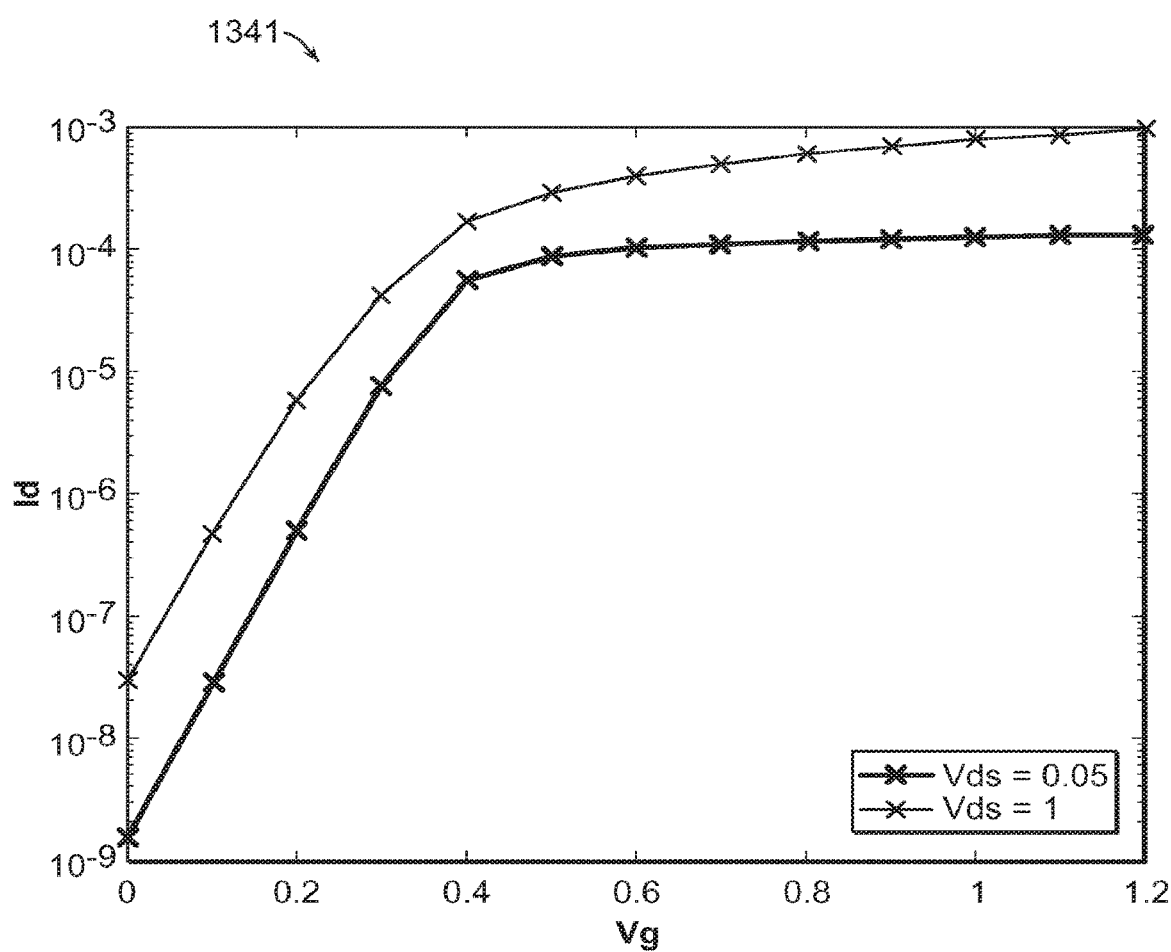
FIG. 13E depicts an exemplary current versus voltage plot in an embodiment.

If the material properties include non-zero contact resistivities, those properties will be accounted for in the resistance calculation as illustrated in FIG. 13D. FIG. 13D depicts the potential over the 3D structural model 1331 when a non-zero contact resistivity is specified for the interface between copper and tantalum nitride. The potential changes rapidly near the interface 1333 in comparison to the potential without contact resistivity and the resistance value 1332 rises accordingly. Such details are important to locate regions that contribute most to the resistance to guide process changes to improve circuit performance.

It should be understood that the potential and current densities described herein are examples of quantities to view on the 3D model and that the display of other quantities that result from the solution of the governing PDE that are of interest in this application are within the scope of the present invention.

While building a single structural model can be valuable, there is increased value in virtual fabrication that builds a large number of models. The embodiments of the present invention enable a user to create and run a virtual experiment. In a virtual experiment of the present invention, a range of values of process parameters can be explored. A virtual experiment may be set up by specifying a set of parameter values to be applied to individual processes (rather than a single value per parameter) in the full process sequence. A single process sequence or multiple process sequences can be specified this way. The 3D modeling engine 275, executing in virtual experiment mode, then builds multiple models spanning the process parameter set, all the while utilizing the electrical behavior modeling described above to extract electrical behavior data for each variation. This capability provided by the embodiments of the present invention may be used to mimic two fundamental types of experiments that are typically performed in the physical fab environment. Firstly, fabrication processes vary naturally in a stochastic (non-deterministic) fashion. As explained herein, embodiments of the present invention use a fundamentally deterministic approach for each virtual fabrication run that nevertheless can predict non-deterministic results by conducting multiple runs. The virtual experiment mode provided by an embodiment of the present invention allows the virtual fabrication environment to model through the entire statistical range of variation for each process parameter, and the combination of variations in many/all process parameters. Secondly, experiments run in the physical fab may specify a set of parameters to be intentionally varied when fabricating different wafers. The virtual experiment mode of the present invention enables the virtual fabrication environment to mimic this type of experiment as well, by performing multiple virtual fabrication runs on the specific variations of a parameter set.

In one embodiment, by enhancing a virtual fabrication environment to support the inclusion of one or more electrical behavior modeling steps in a process sequence for virtually fabricating a semiconductor device structure, the effect of changes in the process sequence on electrical behavior in a selected region of the semiconductor device structure can be determined thereby leading to an optimized fabrication sequence. Additionally, by conducting virtual experiments in a virtual fabrication environment, multiple device structure models may be generated using ranges of process parameters and design parameter variations to determine electrical behavior for designated regions in an entire process and design space of interest in a way not economically or physically feasible in a physical fabrication environment or with conventional approaches requiring the exporting of a mesh to an external electrical simulation tool.

Each process in the fabrication sequence has its own inherent variation. To understand the effect of all the aggregated process variations in a complex flow is quite difficult, especially when factoring in the statistical probabilities of the combinations of variations. Once a virtual experiment is created, the process sequence is essentially described by the combination of numerical process parameters included in the process description. Each of these parameters can be characterized by its total variation (in terms of standard deviation or sigma values), and therefore by multiple points on a Gaussian distribution or other appropriate probability distribution. If the virtual experiment is designed and executed to examine all of the combinations of the process variations (multiple points on each Gaussian, for example the ±3 sigma, ±2 sigma, ±1 sigma, and nominal values of each parameter), then the resulting graphical and numerical outputs from electrical behavior modeling steps in the sequence cover the total variation space of the technology. Even though each case in this experimental study is modeled deterministically by the virtual fabrication system, the aggregation of the virtual metrology results contains a statistical distribution. Simple statistical analysis, such as Root Sum Squares (RSS) calculation of the statistically uncorrelated parameters, can be used to attribute a total variation metric to each case of the experiment. Then, all of the electrical behavior data, both numerical and graphical, can be analyzed relative to the total variation metric.

In typical trial-and-error experimental practice in a physical fab, a structural measurement resulting from the nominal process is targeted, and process variations are accounted for by specifying an overly large (conservative) margin for the total variation in the structural measurement (total structural margin) which must be anticipated in subsequent processes. In contrast, the virtual experiment embodiments of the present invention can provide quantitative predictions of the total variation envelope for a structural measurement at points in the integrated process flow. The total variation envelope, rather than the nominal value, of the structural measurement may then become the development target. This approach can ensure acceptable total structural margin throughout the integrated process flow, without sacrificing critical structural design goals. This approach, of targeting total variation may result in a nominal intermediate or final structure that is less optimal (or less aesthetically pleasing) than the nominal structure that would have been produced by targeting the nominal process. However, this sub-optimal nominal process is not critical, since the envelope of total process variation has been accounted for and is more important in determining the robustness and yield of the integrated process flow. This approach is a significant shift in semiconductor technology development, from an emphasis on the nominal process to an emphasis on the envelope of total process variation.

Figure 14:
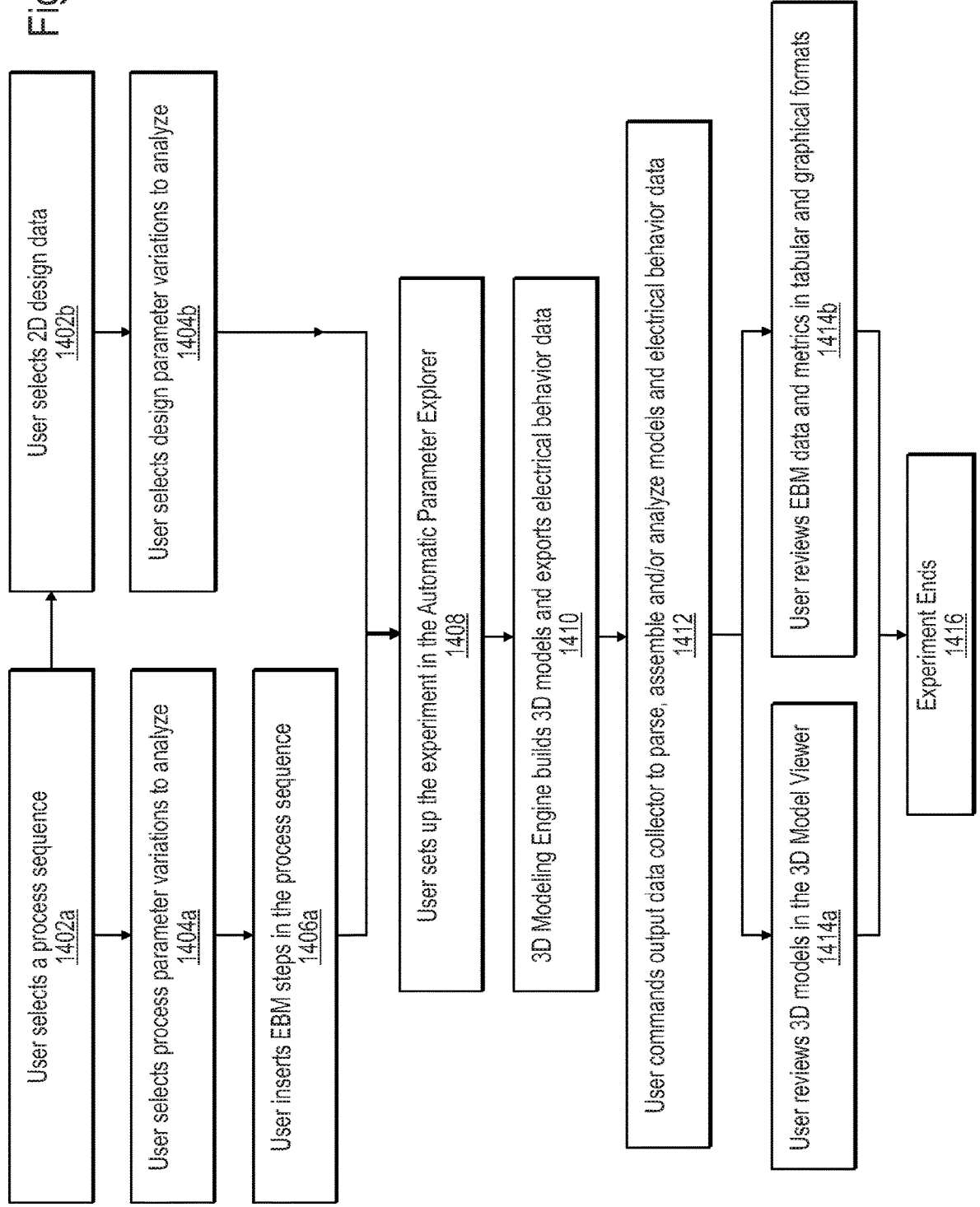
FIG. 14 depicts an exemplary sequence of steps followed by an embodiment of the present invention to set up and perform a virtual experiment generating data for multiple semiconductor device structure models.
Figure 15:
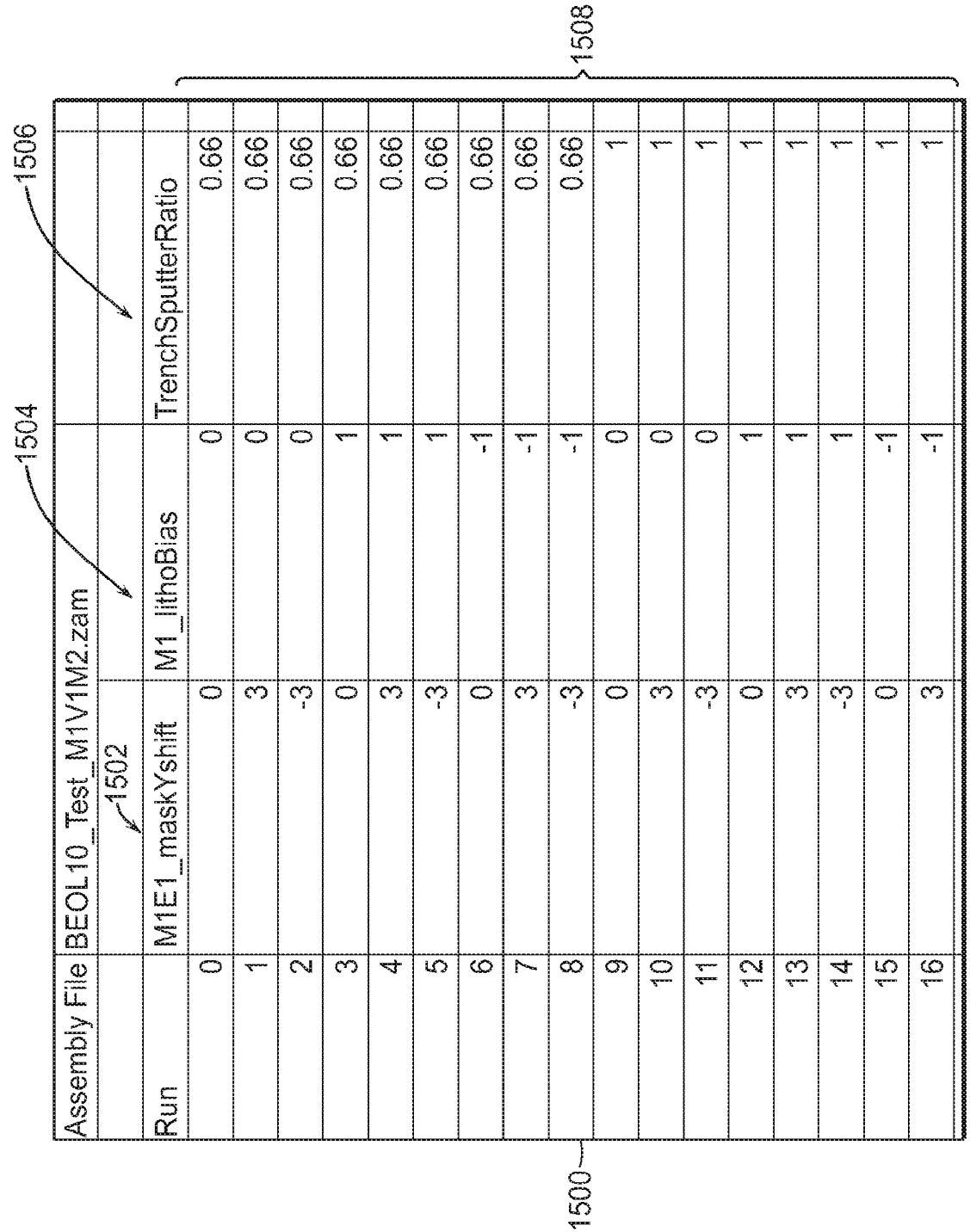
FIG. 15 depicts an exemplary automatic parameter explorer for a process variation study on the capacitance between two nets of a section of BEOL interconnect provided by an embodiment of the present invention.

FIG. 14 depicts an exemplary sequence of steps followed by an embodiment of the present invention to set up and perform a virtual experiment generating electrical behavior data for multiple semiconductor device structural models. The sequence begins with a user selecting a process sequence and identifying/creating 2D design data (steps 1402a and 1402b). The user may select process parameter variations to analyze (step 1404a) and/or design parameter variations to analyze (step 1404b). The user inserts one or more electrical behavior modeling steps in the process sequence as set forth above (step 1406a). The user may set up the virtual experiment with the aid of a specialized user interface such as an automatic parameter explorer 226 (step 1408). An exemplary automatic parameter explorer 1500 is depicted in FIG. 15 for a process variation study on the capacitance between two nets of a section of BEOL interconnect shown in FIG. 13C. The automatic parameter explorer may display, and allow the user to vary, the process parameters to be varied 1502, 1504, 1506 and the list of 3D models to be built with their corresponding different parameter values 1508. The parameter ranges for a virtual experiment can be specified in a tabular format.

Continuing with the discussion of FIG. 14, the 3D modeling engine 275 builds the 3D models and exports the electrical behavior measurement data for review (step 1410). In one embodiment a virtual experiment mode provides output data handling from electrical behavior determinations. The output data from the electrical behavior determinations may be parsed and assembled into a desired form as indicated by the user (step 1412). With this parsing and assembling, subsequent quantitative and statistical analysis can be conducted. A separate output data collector module 295 may be used to collect 3D model data and electrical behavior t results from the sequence of virtual fabrication runs that comprise the virtual experiment and present them in graphical and tabular formats. FIG. 16 depicts an exemplary tabular-formatted display 1600 of electrical behavior data, capacitance, in this case, generated by a virtual experiment in an embodiment of the present invention. In the tabular formatted display, the electrical data collected during the virtual experiment 1602 and the list of virtual fabrication runs 1604 may be displayed.

Figure 17:
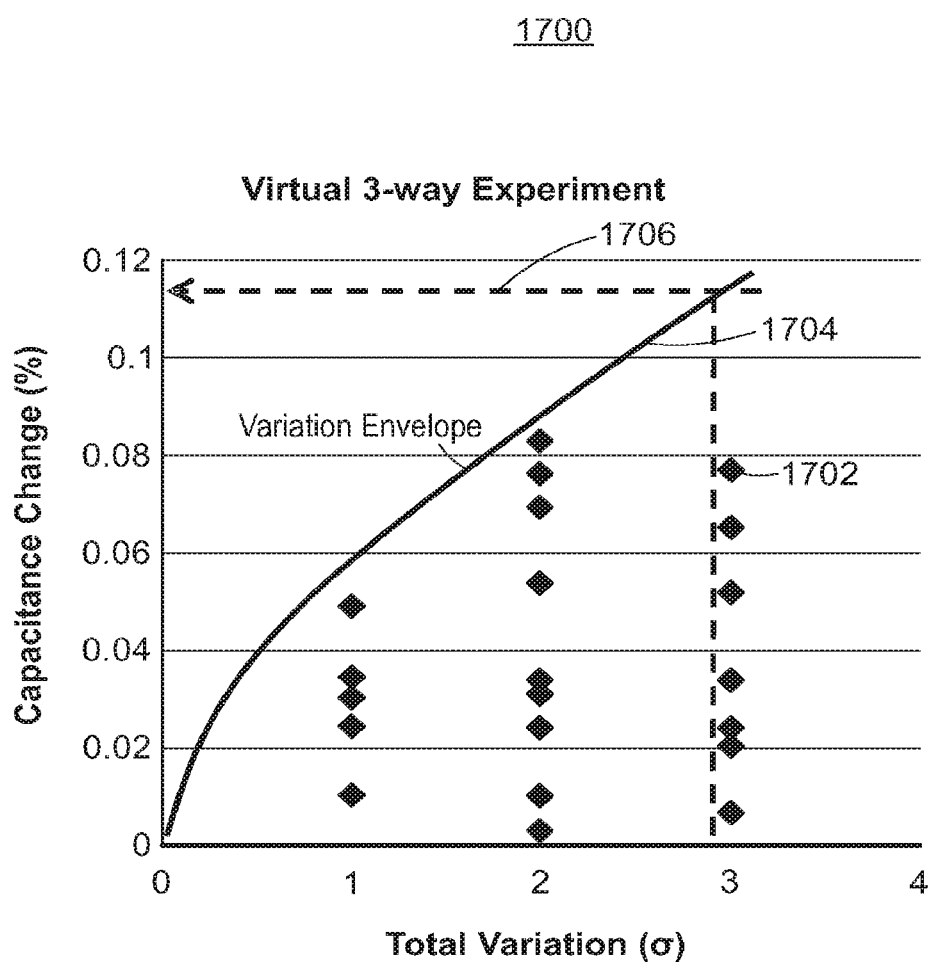
FIG. 17 depicts an exemplary 2D X-Y graphical plot display of data generated by a virtual experiment in an embodiment of the present invention.

FIG. 17 depicts an exemplary 2D X-Y graphical plot display 1700 of data generated by a virtual experiment in an embodiment of the present invention. In the example depicted in FIG. 17, the total variation in capacitance between the two nets of FIG. 13C due to varying three parameters in preceding steps of the process sequence is shown. Each diamond 1702 represents a virtual fabrication run. The variation envelope 1704 is also displayed as is the depicted conclusion 1706 that the downstream process modules must support approximately 11.5% of total variation in capacitance to achieve robustness through 3 sigma of incoming variation. The virtual experiment results can also be displayed in multi-dimensional graphic formats.

Once the results of the virtual experiment have been assembled, the user can review 3D models that have been generated in the 3D viewer (step 1414a) and review the electrical behavior data and metrics presented for each virtual fabrication run (step 1414b). Depending on the purpose of the virtual experiment, the user can analyze the output from the 3D modeling engine for purposes of developing a process sequence that achieves a desired nominal structural model, for further calibrating process step input parameters, or for optimizing a process sequence to achieve a desired process window.

The 3D modeling engine's 275 task of constructing multiple structural models for a range of parameter values (comprising a virtual experiment) is very compute intensive and therefore could require a very long time (many days or weeks) if performed on a single computing device. To provide the intended value of virtual fabrication, model building for a virtual experiment should occur many times faster than a physical experiment. Achieving this goal with present day computers requires exploiting opportunities for parallelism. Accordingly, in one embodiment, the 3D modeling engine 275 of the present invention therefore may use multiple cores and/or processors to perform individual modeling steps. In addition, the structural models for different parameter values in a set may be independent and can therefore be built in parallel using multiple cores, multiple processors, or multiple systems.

Although parts of the description contained herein have discussed solving electrical behavior modeling steps directly from an implicit geometry representation of a 3D structural device model, in one embodiment, the implicit geometry representation may be converted to an explicit representation and then solved using a solver integrated directly into the virtual fabrication environment. While still slower from a time standpoint due to the need to create a mesh, the integration of the solver into the environment avoids the need to export the mesh for processing by a separate solver. For example, in one embodiment of the present invention, the fill fractions of the voxel representation are used to reconstruct an explicit representation of the boundary of the geometry to create a mesh to be used for electrical behavior simulation within the virtual fabrication environment. As noted above, the fill fractions of a boundary voxel and others in its neighborhood may be used to determine the boundary explicitly. The determined boundary could then be used to generate an explicit mesh of the geometry although it would take considerable computation time which is non-desirable in the virtual fabrication environment. This approach also allows automation of the exploration of electrical behavior under process variation compared to conventional methods that require manual export of the mesh and import into conventional electrical simulation tools. It should be noted however that the generation of the explicit representation and mesh generation based thereon can be a computationally expensive and may be prohibitive to explorations with a large number of virtual experiments.

Further, in another embodiment, the virtual fabrication system may incorporate electrical simulation by using an explicit boundary representation, such as B-rep, to represent the structure, and create a mesh directly from that explicit representation for electrical behavior simulation. While explicit representations are not as robust for virtual fabrication for the reasons described above, integrating the electrical behavior into the virtual fabrication system would provide the advantages described in the previous paragraph.
Material Resistivity In one embodiment, electrical behavior modeling provided by the virtual fabrication environment allows the variation of material resistivity that occurs based on conductor size to be modeled.

At the microscopic scale, electricity is conducted by moving electrons. These electrons frequently collide with atoms in the metal or with each other, and these collisions reduce the speed of the electrons and hence reduce the current resulting from the transport of the electrons. The electron mean free path measures the mean distance an electron travels between collisions and is a useful measure of conduction efficiency. A reduction in the electron mean free path increases the resistivity of a material, and vice versa. The mean free path of electrons under ideal conditions in a crystalline structure can be very large, since the ordered arrangement of atoms in the crystal lattice provides for clear paths along the crystal. However the atomic structure of metals is typically polycrystalline, consisting of many individual pieces of crystalline material (grains) with different orientations. Electrons traveling through a polycrystalline material scatter from the boundaries between grains, and from the exterior surfaces of the conductor.

The variation of material resistivity with conductor size is of primary importance in semiconductor devices since delay scales with resistivity, and any increase in resistivity is detrimental. Several physical effects act to reduce the electron mean free path significantly in the conductors within a micro- or nano-scale semiconductor device. One large contributor is electron scattering from grain boundaries within the metal. As conductors shrink, the grain size typically also shrinks. This increases the density of grain boundaries, increasing grain boundary scattering and hence increasing resistivity. A second large contributor is scattering from the exterior surfaces of the conductor. Here as well, as conductor size is reduced the exterior surfaces are brought closer together, resulting in more electron scattering. If conductor size becomes similar to the electron mean free path, scattering from the exterior boundaries may become dominant and greatly increase the material resistivity. Further, surface scattering causes material resistivity to vary within the conductor. The probability of surface scattering is much higher near the exterior boundaries of the conductor, resulting in higher resistivity near the boundary.

There are many other physical effects which may cause size dependence of material resistivity; for example impurities, electron-electron interactions, electron-phonon interactions and quantization effects. Although scattering is the primary mechanism described herein, it should be understood that the electrical behavior modeling may be used to model size dependence of resistivity caused by other physical mechanisms.

In one embodiment, in order to model resistance of nano-scale electrical wires, the variation of material resistivity with conductor size is included in the calculations performed in the virtual fabrication environment. In the context of a numerical PDE solver for resistance, the resistivity in each grid cell from the model is varied in order to capture the variation in material resistivity. While there are a number of approaches that would allow the variation in resistivity to be determined, some of these are not well suited for a virtual fabrication environment where speed is required and arbitrary 3D shapes must be handled. For example, one previous method to model resistance variation models the resistance change using a surface integral over nearby conductor boundaries:

$$\frac{\rho_0}{\rho_s}(p=0,\lambda) = \frac{3}{4\pi s} \int_s ds \int_0^{2\pi} d\phi \int_0^{\pi} d\theta \sin\theta \cos^2\theta \left[1 - \exp\left(\frac{-L}{\lambda}\right)\right]$$

This equation models resistivity in the proximity of a conductor exterior boundary caused by entire diffuse surface scattering. A similar equation may be used to model specular scattering (not shown here). Both equations work for arbitrary 3D conductor shapes, but are quite slow to compute because they involve a surface integral over all the voxels of nearby conductor boundaries and so are not appropriate for virtual fabrication environments. Another method to capture the variation in material resistivity, uses a compact model for surface scattering as a function of conductor perimeter length (U) and cross-sectional area (S):

$$\rho = \rho_0\left(1 + C(1-p)\frac{U}{S}l\right)$$

A similar equation (not shown) can be used to account for grain boundary scattering. Neither of these equation is predictive; coefficients C, p, l, are simply fit to known experimental data and so while this model works adequately for rectangular conductors where the perimeter and area are known everywhere, it is quite difficult to apply these equations to arbitrary 3D conductor shapes where the concepts of local perimeter and cross-section area are not well defined. This approach also does not model the variation of resistivity within a conductor, but instead models the total effective resistance of the conductor.

To address the need for speed and flexibility in shape that is desirable in a virtual fabrication environment when modeling variation in material resistivity, in one embodiment an expression for resistivity as a function of distance to the nearest conductor boundary is used by the virtual fabrication environment:

$$\rho(d) = \rho_b + \rho_s e^{-\frac{d}{\lambda}}$$

This approach has at least two key advantages over other techniques. Firstly, it captures the variation of resistivity inside the conductor in addition to the total effective resistance; the resistivity is higher near the conductor boundary and decays exponentially away from the boundary. Secondly, resistivity may be easily and efficiently calculated for arbitrary 3D shapes with this approach.

The first step in the implementation of the distance-based model is to calculate the distance to the nearest conductor boundary in every computational cell of the conductor. This distance may be stored in a 3D scalar field typically called the 'distance field'. The distance field computation may be expressed as a solution to the Eikonal equation:

$$|\nabla u(x)|=1$$

where u(x) is the signed distance, and is assigned the value zero on the conductor boundary. Different algorithms may be used to solve this equation, including, but not limited to, discretization and solution with standard finite difference techniques and fast algorithms such as the Fast Marching and Fast Sweep methods. The specific solution method used to solve the distance filed computation may vary between embodiments. Once the distance field has been computed, the material resistivity as a function of distance may be calculated in every computational cell of the conductor and used during the resistance solution. The resulting resistance solution exhibits higher resistivity near the conductor boundary, forcing current to flow away from the boundary and through the interior of the conductor. The overall resistance is therefore increased. Compared to a constant resistivity model, the distance-based variable resistivity model captures the behavior of small conductors more accurately and is therefore higher fidelity, with little additional computational cost.

In one embodiment, a materials database/library may store parameters controlling variation of resistivity with conductor size for each type of conductor. For example, separate size correction coefficients may be specified as default values or provided by the user for every type of conductor in the materials database/library. In an embodiment, a user interface may present the parameters to a user during a selection of an electrical behavior modeling step.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in many computing languages.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A non-transitory computer-readable medium holding computing device-executable instructions for determining electrical behavior in a circuit in a semiconductor device structure being virtually fabricated, the circuit including at least one of one or more individual devices and one or more interconnect structures, the instructions when executed causing the computing device to:

receive a process sequence for a semiconductor device structure to be virtually fabricated, the process sequence including at least one electrical behavior modeling step;

perform with the computing device a virtual fabrication run for the semiconductor device structure using the process sequence and 2D design data, the virtual fabrication run:

executing the process sequence, the executing of the process sequence building a 3D structural model of the semiconductor device structure using an implicit geometry representation for the 3D structural model, the implicit geometry representation defining an interface between materials in the 3D structural model without an explicit representation of (x,y,z) coordinate locations of that interface, and performing the at least one electrical behavior modeling step to determine electrical behavior data in a designated region of the 3D structural model using the implicit geometry representation without generating a conformal surface or volume mesh from the 3D structural model, and display the electrical behavior data determined by the at least one electrical behavior modeling step of the virtual fabrication run in a 3D view of the 3D structural model that indicates a structural origin of the electrical behavior data.

2. The medium of claim 1 wherein the at least one electrical behavior modeling step is a resistance solving step indicating a point during the process sequence when a resistance value should be determined between ports at the designated region in the 3D structural model.

3. The medium of claim 2 wherein the at least one resistance solving step determines material resistivity based on a conductor size.

4. The medium of claim 2 wherein the at least one resistance solving step models size-dependent resistivity by calculating varying material resistivity values within the conductor in order to predict an overall resistance value of a conductor.

5. The medium of claim 1 wherein the electrical behavior modeling step is a capacitance solving step indicating a point during the process sequence when at least one capacitance value should be determined at the selected region in the 3D structural model.

6. The medium of claim 1 wherein the instructions when executed further cause the computing device to:
receive a plurality of parameter variations for the process sequence or the 2D design data;
perform a plurality of virtual fabrication runs using the parameter variations in a virtual experiment that builds a plurality of 3D structural models;
determine electrical behavior at the respective designated regions for each of the plurality of virtual fabrication runs in the virtual experiment; and
output the determined electrical behavior for each of the plurality of virtual fabrication runs in the virtual experiment.

7. The medium of claim 1 wherein the electrical behavior is determined for at least one of an interconnect, transistor and other device in the designated region.

8. The medium of claim 1 wherein the at least one electrical behavior modeling step calculates effective material properties in mesh elements containing a plurality of materials.

9. The medium of claim 1 wherein the implicit geometry representation is voxel-based.

10. A computing device-implemented method for determining electrical behavior in a circuit in a semiconductor device structure being virtually fabricated, the circuit including at least one of one or more individual devices and one or more interconnect structures, the method comprising:
receiving a process sequence for a semiconductor device structure to be virtually fabricated, the process sequence including at least one electrical behavior modeling step;
performing with the computing device a virtual fabrication run for the semiconductor device structure using the process sequence and 2D design data, the virtual fabrication run:
executing the process sequence, the executing of the process sequence building a 3D structural model of the semiconductor device structure using an implicit geometry representation for the 3D structural model, the implicit geometry representation defining an interface between materials in the 3D structural model without an explicit representation of (x,y,z) coordinate locations of that interface, and
performing the at least one electrical behavior modeling step to determine electrical behavior data in a designated region of the 3D structural model using the implicit geometry representation without generating a conformal surface or volume mesh from the 3D structural model, and
displaying the electrical behavior data determined by the at least one electrical behavior modeling step of the virtual fabrication run in a 3D view of the 3D structural model that indicates a structural origin of the electrical behavior data.

11. The method of claim 10 wherein the at least one electrical behavior modeling step is a resistance solving step indicating a point during the process sequence when a resistance value should be determined between ports at the designated region in the 3D structural model.

12. The method of claim 11 wherein the at least one resistance solving step determines material resistivity based on a conductor size.

13. The method of claim 11 wherein the at least one resistance solving step models size-dependent resistivity by calculating varying material resistivity values within the conductor in order to predict an overall resistance value of a conductor.

14. The method of claim 10 wherein the electrical behavior modeling step is a capacitance solving step indicating a point during the process sequence when at least one capacitance value should be determined at the selected region in the 3D structural model.

15. The method of claim 10, further comprising:
receiving a plurality of parameter variations for the process sequence or the 2D design data;
performing a plurality of virtual fabrication runs using the parameter variations in a virtual experiment that builds a plurality of 3D structural models;
determining electrical behavior at the respective designated regions for each of the plurality of virtual fabrication runs in the virtual experiment; and
outputting the determined electrical behavior for each of the plurality of virtual fabrication runs in the virtual experiment.

16. The method of claim 10 wherein the electrical behavior is determined for at least one of an interconnect, transistor and other device in the designated region.

17. The method of claim 10 wherein the at least one electrical behavior modeling step calculates effective material properties in mesh elements containing a plurality of materials.

18. The method of claim 10 wherein the implicit geometry representation is voxel-based.

19. A computing device, configured to determine electrical behavior in a circuit in a semiconductor device structure being virtually fabricated, the circuit including at least one of one or more individual devices and one or more interconnect structures, the computing device further comprising:
a processor;
a memory holding instructions that when executed perform one or more virtual fabrication runs for the semiconductor device structure using a process sequence and 2D design data, the process sequence including at least one electrical behavior modeling step, the one or more virtual fabrication runs:
executing the process sequence, the executing of the process sequence building a 3D structural model of the semiconductor device structure using an implicit geometry representation for the 3D structural model, the implicit geometry representation defining an interface between materials in the 3D structural model without an explicit representation of (x,y,z) coordinate locations of that interface, and performing the at least one electrical behavior modeling step to determine electrical behavior data in a designated region of the 3D structural model using the implicit geometry representation without generating a conformal surface or volume mesh from the 3D structural model, wherein the electrical behavior data determined by the at least one electrical behavior modeling step of the virtual fabrication run is displayed by the computing device in a 3D view of the 3D structural model that indicates a structural origin of the electrical behavior data.

20. The computing device of claim 19 wherein the implicit geometry representation is voxel-based.

* * * * *